(12) United States Patent  
Allen et al.

(10) Patent No.: US 9,122,372 B2  
(45) Date of Patent: Sep. 1, 2015

(54) EVENT FLOW USER INTERFACE

(71) Applicant: Allen Learning Technologies, Mendota Heights, MN (US)

(72) Inventors: Michael W. Allen, Bloomington, MN (US); Steven M. Birth, Minneapolis, MN (US)

(73) Assignee: Allen Learning Technologies, Mendota Heights, MN (US)

( * ) Notice: Subject to any disclaimer, the term of this patent is extended or adjusted under 35 U.S.C. 154(b) by 168 days.

(21) Appl. No.: 13/920,795

(22) Filed: Jun. 18, 2013

(65) Prior Publication Data

US 2014/0007011 A1    Jan. 2, 2014

Related U.S. Application Data

(60) Provisional application No. 61/661,107, filed on Jun. 18, 2012, provisional application No. 61/662,504, filed on Jun. 21, 2012.

(51) Int. Cl.  
*G06F 3/0481* (2013.01)

(52) U.S. Cl.  
CPC .................................. *G06F 3/04817* (2013.01)

(58) Field of Classification Search  
CPC ...................................................... G06F 3/0482  
USPC .......................................................... 715/833  
See application file for complete search history.

(56) References Cited

U.S. PATENT DOCUMENTS

| | | | |
|---|---|---|---|
| 6,638,313 B1 | 10/2003 | Freeman et al. | |
| 6,725,427 B2 | 4/2004 | Freeman et al. | |
| 6,768,999 B2 | 7/2004 | Prager et al. | |
| 7,941,758 B2 | 5/2011 | Tremblay | |
| 8,127,239 B2 | 2/2012 | Louch et al. | |
| 8,135,577 B2 | 3/2012 | Seymour et al. | |
| 8,839,087 B1 * | 9/2014 | Hayden | 715/204 |
| 2007/0240039 A1 | 10/2007 | Hosotsubo | |
| 2008/0294994 A1 | 11/2008 | Kruger et al. | |
| 2010/0328352 A1 | 12/2010 | Shamir et al. | |
| 2011/0010670 A1 | 1/2011 | Paas et al. | |
| 2011/0321003 A1 | 12/2011 | Doig et al. | |

OTHER PUBLICATIONS

International Search Report issued in International Application No. PCT/US2013/046373, mailed Oct. 9, 2013, 3 pages.

* cited by examiner

*Primary Examiner* — Omar Abdul-Ali  
(74) *Attorney, Agent, or Firm* — Hamre, Schumann, Mueller & Larson, P.C.

(57) ABSTRACT

A user interface for a computer that can display one or more virtual or digital files that allow a user to sort through and select a particular virtual or digital file to interact with, or a digital object associated with that virtual or digital file. The user interface described herein allows a user to view and browse rapidly through a sequence of images representing one or more virtual or digital files by displaying in the user interface a combination of two images simultaneously, side-by-side, while continuously maintaining the specified sequence.

17 Claims, 14 Drawing Sheets

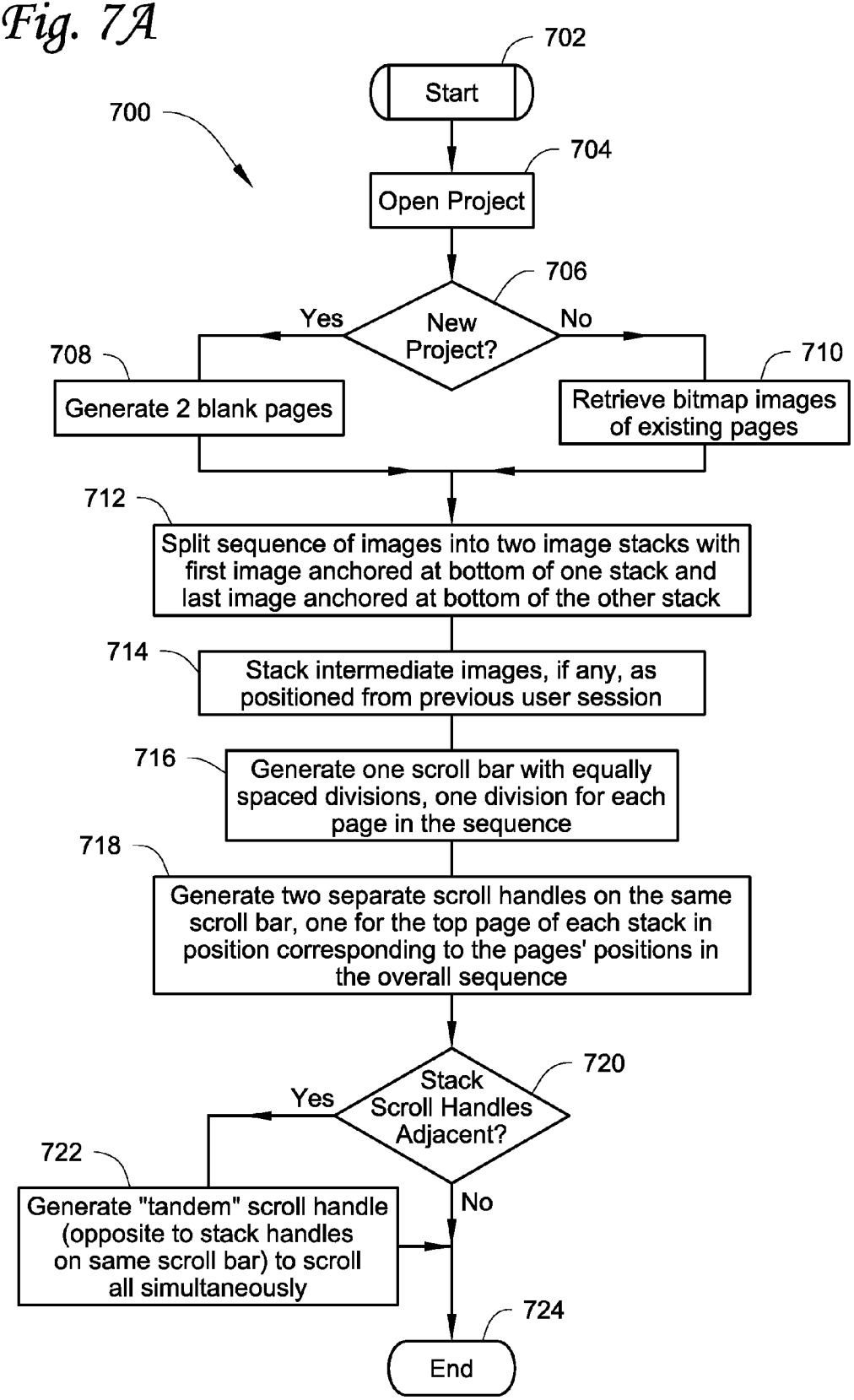

EVENT FLOW USER INTERFACE

FIELD

This description relates generally to methods and devices for animating graphical objects within a graphical user interface displayed on a display for a computer.

BACKGROUND

A computer user interface that displays an icon representing a digital file, such that when a user selects the icon, the computer executes particular software associated with the digital file is known. Improved computer interfaces that are more intuitive to the user may be desirable.

BRIEF SUMMARY

Disclosed herein are methods and devices for animating graphical objects within a graphical user interface displayed on a display for a computer.

In particular, a user interface for computer devices is provided that can display multiple virtual or digital files that allow a user to sort through to select a particular virtual or digital file for interacting with that virtual or digital file, or a digital object that is associated with that virtual or digital file.

An "Event Flow" user interface, as described herein, allows a user to view and browse rapidly through a sequence or "flow" of pages, files, documents, or interactive events, herein collectively referred to as "Pages", by displaying in the user interface a combination of two Pages simultaneously, side-by-side, while continuously maintaining the specified sequence. The "flow" of the Pages is generated by animation of the Pages or images which are representative of and associated with the Pages.

Pages are virtual containers that can hold static and/or interactive virtual or digital objects such as text, graphics, photos, audio, video, segments of logic and computer code, tables, animations, questions, feedback, live streaming video, live maps, or any combination thereof. Each Page can be considered a module in a stream of modules, much like pages of a book.

The devices and methods disclosed herein use a specialized computer executing computer executable instructions for the Event Flow user interface. The device executing the Event Flow user interface generates portions of the user interface, such as the Pages or the container's contents, into image files, e.g. bitmap images, at particular moments in time. The image files are then displayed on a display connected to the device as a part of the Event Flow user interface. The image files facilitate rapid browsing through the Pages and serve as links to the Pages' contents and their associated content editors.

An embodiment of a computer-implemented method comprises displaying a graphical user interface on a display of a computer. The graphical user interface includes a first view portion and a second view portion; the first view portion includes a first image associated with a first digital content page stored in a memory of the computer; and the second view portion includes a second image associated with a second digital content page stored in the memory.

In an embodiment of the computer-implemented method, the first view portion includes at least one more image, the at least one more image associated with an additional digital content page stored in the memory, wherein the at least one more image is displayed stacked behind the first image, wherein the first image and the at least one more image form a first stacked images.

In an embodiment of the computer-implemented method, the second view portion includes at least one more image, the at least one more image associated with an additional digital content page stored in the memory, wherein the at least one more image is displayed stacked behind the second image, wherein the second image and the at least one more image form a second stacked images.

In an embodiment of the computer-implemented method, the graphical user interface further comprises a slide bar; a first slider associated with the slide bar and for moving along the slide bar for controlling a first stacked order of the first stacked images; a second slider associated with the slide bar and for moving along the slide bar for controlling a second stacked order of the second stacked images; and a tandem slider associated with the slide bar and for moving along the slide bar for controlling both the first stacked order and the second stacked order together.

The graphical user interface can further comprise of a first page identifier displaying the first stacked order of a top image of the first stacked images, wherein the first page identifier dynamically changes as the first slider is moved along the slide bar and/or as the tandem slider is moved along the slide bar.

The graphical user interface can further comprise of a second page identifier displaying the second stacked order of a top image of the second stacked images, wherein the second page identifier dynamically changes as the second slider is moved along the slide bar and/or as the tandem slider is moved along the slide bar. The second page identifier and the first page identifier may be included in the graphical user interface.

The graphical user interface can further comprise one or more page creation buttons for adding another image associated with another page stored in the memory to the first stacked images.

The graphical user interface can further comprise one or more page creation buttons for adding another image associated with another page stored in the memory to the second stacked images.

The graphical user interface can further comprise one or more page creation buttons for adding another image associated with another page stored in the memory to the first stacked images, and one or more page creation buttons for adding another image associated with another page stored in the memory to the second stacked images.

The graphical user interface can further comprise a drag-and-drop image which can be selected from the first or second stacked images and dropped into the second or first stacked images, wherein the displaying of the first and/or second stacked images change dynamically to display removal of the selected image by changing the first and/or second stacked order The computer-implemented method can further include displaying the slider bar only when the number of pages stored in the memory is more than two.

The computer-implemented method can further include displaying the slider bar when the number of pages stored in the memory is more than three.

The computer-implemented method can further include displaying the slider bar when the number of pages stored in the memory is equal to three.

The computer-implemented method can further include undisplaying the slider bar when the number of pages stored in the memory is fewer than three. The term undisplaying is used herein to mean stop displaying, removing from being displayed, not displaying, never displaying, etc.

The computer-implemented method can further include undisplaying the slider bar when the number of pages stored in the memory is two.

The computer-implemented method can further include undisplaying the slider bar when the number of pages is fewer than two.

The graphical user interface can include an edit mode activation interactive element, wherein a user's selection of the edit mode activation interactive element changes the graphical user interface's images to editable digital content loaded from the memory.

The graphical user interface can include an edit mode deactivation interactive element, wherein a user's selection of the edit mode deactivation interactive element changes the graphical user interface's editable digital content to digital images.

An embodiment of a specialized computer comprises a memory which has stored therein computer executable instructions for a graphical user interface; a processor in communication with the memory, the processor being configured to load and execute the computer executable instructions of the graphical user interface when the computer executable instructions are read from the memory by the processor; and a display in communication with the processor, the display being configured to display the graphical user interface according to the computer executable instructions executed by the processor, wherein the graphical user interface displayed on the display includes a first view portion and a second view portion, the first view portion includes a first image associated with a first digital content page stored in a memory of the computer, and the second view portion includes a second image associated with a second digital content page stored in the memory.

An embodiment of a non-transitory machine-readable storage medium has stored therein computer executable instructions for a graphical user interface, the non-transitory machine-readable storage medium being connectable to a computer, wherein when the computer executes the computer executable instructions, the graphical user interface is displayed on a display of the computer, the graphical user interface comprises a first view portion and a second view portion; the first view portion includes a first image associated with a first digital content page stored in a memory of the computer; and the second view portion includes a second image associated with a second digital content page stored in the memory.

An embodiment of a graphical user interface includes any of the Event Flow user interface described herein.

An embodiment of computer executable instructions for a graphical user interface includes any of computer-implemented methods for any of the Event Flow user interface described herein.

An embodiment of a non-transitory machine-readable storage medium has stored therein computer executable instructions for any of the Event Flow user interface described herein.

An embodiment of a specialized computer comprises a memory which has stored therein computer executable instructions for any of the Event Flow user interface described herein.

The present invention may be further understood with reference to the following description and the appended drawings, wherein like elements are referred to with the same reference numerals.

BRIEF DESCRIPTION OF THE DRAWINGS

FIG. 7A shows a flow diagram for an initializing setup for the Event Flow user interface according to one embodiment.

DETAILED DESCRIPTION

Figure 1:
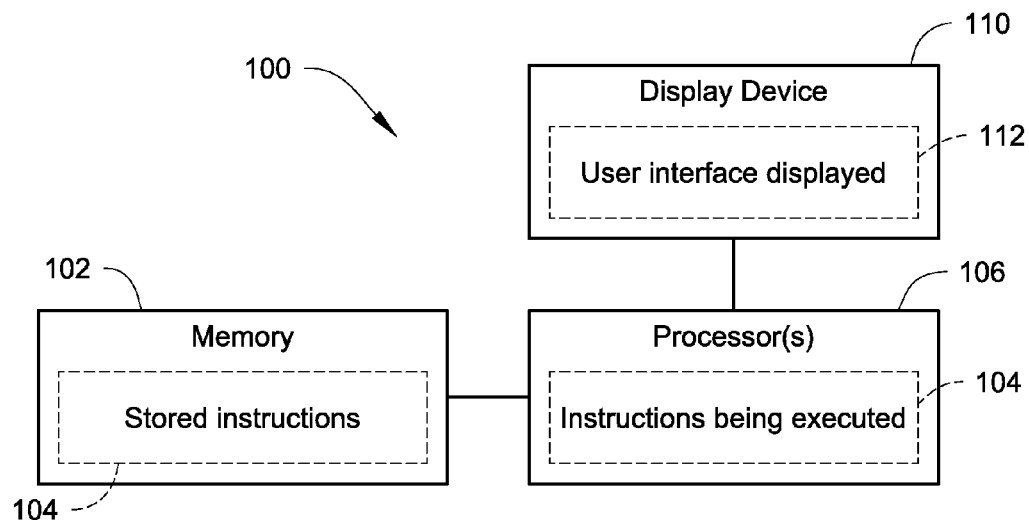
FIG. 1 shows an embodiment of a schematic block diagram of a computer.

The features described herein can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and Flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features described herein can be implemented on a computer having a display or a display device (such as, for example, a CRT (cathode ray tube) monitor, a LCD (liquid crystal display) monitor, a Plasma monitor, an OLED (organic light-emitting diode) monitor, etc.) for displaying information to the user and an input device (such as, for example, a keyboard; a pointing device such as a mouse or a trackball; a touch screen; a finger-gesture device; etc.) by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network. The relationship of client and server arises by virtue of computer programs running on the respective computers and having a client-server relationship to each other.

The embodiments described herein provide methods and devices for animating graphical objects within a graphical user interface displayed on a display for a computer.

In particular, an Event Flow user interface for computer devices is provided that can display multiple virtual or digital files that allow a user to sort through to select a particular virtual or digital file for interacting with that virtual or digital file, or a digital object that is associated with that virtual or digital file.

The Event Flow user interface can include one or more Pages represented as one or more images in a sequential order. Each one of the one or more images is associated with at least one of the one or more Pages. The Event Flow user interface also includes a first view portion and a second view portion displayed side by side, the first view portion showing a first displayed image associated with a first Page, and the second view portion showing a second displayed image associated with a second Page.

Both of the first view portion and the second view portion can display a stack of images. Each of the one or more images is associated with a Page, and the stacking order of the one or more images in the stack provides a visual representation of the sequential order of the one or more Pages. The Event Flow user interface can display an animation of the images moving along the sequential order of the stacking order that represents the sequential order of the one or more Pages by generating the "flow" animation of the one or more images and the stack of the one or more images. For example, the "flow" animation can be a left-right sequence like pages of a book.

The Event Flow user interface can also include a slide bar (also called scroll bar) displayed below the first view portion and the second view portion. The slide bar includes a first slider for controlling which of the one or more images is displayed in the first view portion. Sliding the first slider along the slide bar sequentially changes a first displayed image according to the sequential order in the first view portion. The slide bar can also include a second slider for controlling which of the images is displayed in the second view portion. Sliding the second slider along the slide bar sequentially changes a second displayed image according to the sequential order in the second view portion. The slide bar user interface can also include a tandem slider for controlling which of the two images are displayed in the first view portion and the second view portion, respectively. Sliding the tandem slider along the slide bar sequentially change the two images displayed in the first view portion and the second view portion, respectively, according to the sequential order of the one or more images.

FIG. 1 shows a schematic block diagram of a specialized computer 100, comprising a memory 102 which has stored therein computer executable instructions 104 for the Event Flow user interface 112. The computer 100 includes a processor 106 in communication with the memory 102. The processor 106 is configured to load and execute the computer executable instructions 104 of the Event Flow user interface 112 when the computer executable instructions 104 are read from the memory 102 by the processor 106. The computer 100 further includes a display 110 in communication with the processor 106. The display 110 is configured to display the Event Flow user interface 112 according to the computer executable instructions 104 executed by the processor 106.

FIGS. 2-6 show examples of the Event Flow user interface 112 displayed on a display connected to a processor. Different aspects of the Event Flow user interfaces 112 are shown throughout the drawings with like reference characters representing like parts.

Figure 2:
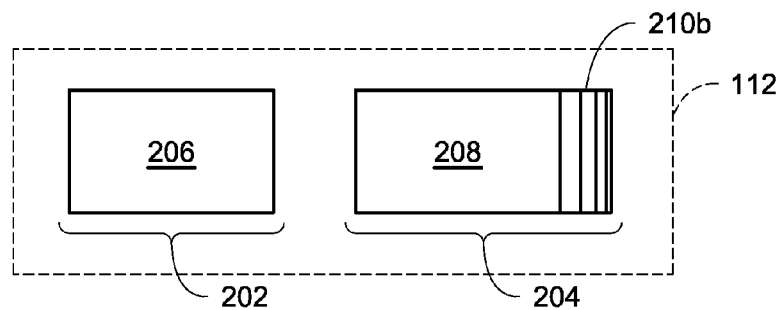
FIGS. 2-6 show different aspects of an embodiment of the user interface as displayed on a display.

FIG. 2 shows the Event Flow user interface 112 which includes two view portions 202, 204. The two view portions 202, 204 include a first view portion 202 and a second view portion 204. The first view portion 202 is displayed on one side of the user interface 112. The first view portion 202 displays at least one image associated with a particular Page. When a new project is opened, the at least one image is a blank image representing a blank first Page. FIG. 2 shows a first image 206 being displayed in the first view portion 202. In the first view portion 202 of the user interface 112, other Pages that sequentially precede the particular Page associated with the first image 206 can also displayed as stacked images 210a behind the first image 206 (as shown in FIG. 3A).

The second view portion 204 is displayed next to the first view portion 202, such that the first view portion 202 and the second view portion 204 are side-by-side. The second view portion 204 of the user interface 112 displays at least one image associated with a particular Page. When a new project is opened, the at least one image is a blank image representing a blank second Page. FIG. 2 shows a second image 208 being displayed in the second view portion 204. In the second view portion 204 of the user interface 112, other Pages that sequentially follow the particular Page associated with the second image 208 are also displayed as stacked images 210b behind the second image 208.

Figure 3A:
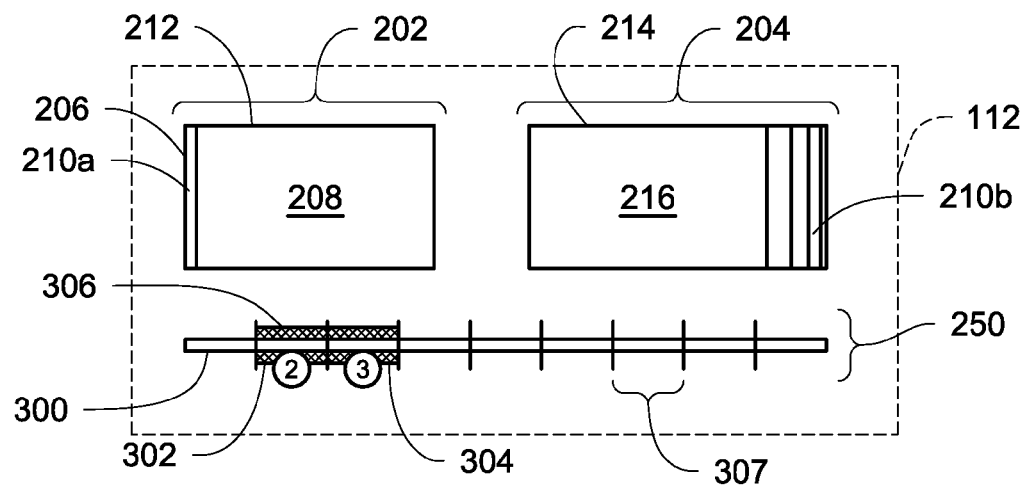
Figure 3B:
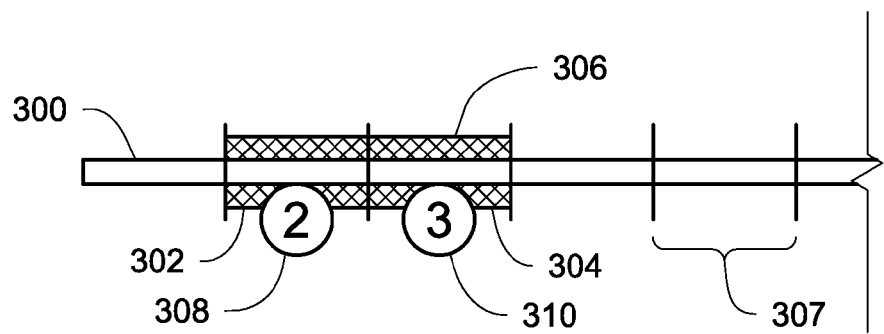

FIGS. 3A and 3B show further examples of the Event Flow user interface 112. FIG. 3A shows the Event Flow user interface 112 including the first view portion 202, which has a first stack 212 of images, including the second image 208 as the top image in the first stack 212. The first image 206 is shown as an image stacked behind the second image 208 in the first stack 212 of the first view portion 202. Other images are shown as stacked images 210a behind the second image 208 in the first stack 212.

FIG. 3A also shows the second view portion 204, which has a second stack 214 of images, including a third image 216 as the top image in the second stack 214. Other images are shown as stacked images 210b behind the third image 216 in the second stack 214.

FIG. 3A further shows a multipart slide controller 250 displayed below the two view portions 202, 204 including the first and second stacks 212, 214. The multipart slide controller 250 allows rapid paging (e.g., changing the images shown in the stacks according to the sequential order of the images) in the first and second stacks 212, 214. The paging generates an animation being displayed in the Event Flow user interface 112 generating an effect much like browsing through a book and viewing facing pages of the book.

FIG. 3B shows an enlarged portion of the multipart slide controller 250 shown in FIG. 3A. The multipart slide controller 250 includes a horizontal slide bar 300, a first slider 302, a second slider 304, and a tandem slider 306. The multipart slide controller 250 allows the first and second stacks 212, 214 to be browsed individually or in tandem. The slide bar 300 includes equally spaced divisions 307, with each division 307 accounting for a particular image in the sequence. Each of the first and second sliders 302, 304 are sized to fit in one of the divisions 307.

The first slider 302 includes a first Page identifier 308 that displays the sequence order of the particular image displayed on top of the first stack 212. When the first slider 302 is moved along the slide bar 300, the first Page identifier 308 changes to be in accordance with the particular image shown on top of the first stack 212. Similarly, the second slider 304 includes a second Page identifier 310 that displays the sequence order of the particular image displayed on top of the second stack 214. When the second slider 304 is moved along the slide bar 300, the second Page identifier 310 changes to be in accordance with the particular image shown on top of the second stack 214. When the tandem slider 306 is moved along the slide bar 300, both of the first and second Page identifiers 308, 310 change to be in accordance with the particular images shown on top of the first and second stacks 212, 214.

The multipart slide controller 250 in the embodiment shown in FIGS. 2-6 functions in the following manner. If the tandem slider 306 is moved to the left, then all of the sliders 302, 304, 306 slide together along the slide bar 300, generating an animation of the image on the top of the first stack 212 moving to the top of the second stack 214. If the tandem slider 306 is moved to the right, then all of the sliders 302, 304, 306 slide together along the slide bar 300, generating an animation of the image on the top of the second stack 214 moving to the top of the first stack 212.

If the first slider 302 is moved to the left, then the tandem slider 306 is no longer displayed, and an image on the top of the first stack 212 is removed to reveal the image that precedes the removed image in accordance with the sequence of the images. As the first slider 302 is moved continuously to the left side of the slide bar 300, the image shown on the top of the first stack 212 approaches an image associated with the first Page in the sequence. If the first slider 302 is moved to the right, then all of the sliders 302, 304, 306 slide together to the right along the slide bar 300, and the image on the top of the second stack 214 is animated to move to the top of the first stack 212.

If the second slider 304 is moved to the left, then all of the sliders 302, 304, 306 slide together to the left along the slide bar 300, and the image on the top of the first stack 212 is animated to move to the top of first stack 214. If the second slider 304 is moved to the right, then the tandem slider 306 is no longer displayed, and the image on the top of the second stack 214 is removed to reveal the image next in order after the removed image in accordance with the sequence of the images. As the second slider 304 is moved continuously to the right side of the slide bar 300, the image shown on the top of the second stack 214 approaches an image associated with the last Page in the sequence. If the second slider 304 is moved to the left, then all of the sliders 302, 304, 306 slide together to the left along the slide bar 300, and the image on the top of the first stack 212 is animated to move to the top of the second stack 214.

Both of the images at the respective tops of the first and second stacks 212, 214 animate to move from one stack 214 to another 212, or vice versa, when the tandem slider 306 is moved horizontally along the slide bar 300. Both of the Page identifiers 308, 310 change to match with the image shown on the respective tops of the first and second stacks 212, 214, as the images shown on the respective tops of the first and second stacks 212, 214 are changed.

Figure 4:
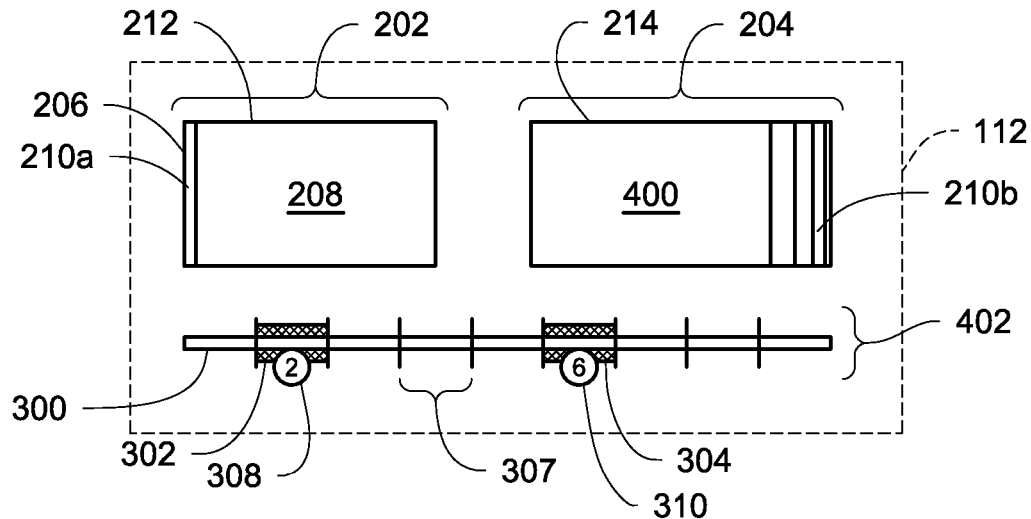

FIG. 4 shows an example Event Flow user interface 112 similar to FIG. 3. The first view portion 202 includes the first stack 212 with the second image 208 as the image on the top of the first stack 212. A portion of the first image 206 is shown as part of the stacked image 210a behind the second image 208 in the first stack 212. The second view portion 204 includes the second stack 214 with a sixth image 400 as the image on the top of the second stack 214 of images. FIG. 4 also shows the multipart slide controller 402 displayed below the first and second stacks 212, 214 for changing one or more of the images shown in one or both of the stacks 212, 214, separately and independently, according to the sequential order of the Pages or the images, in the first and second stacks 212, 214.

The images in the first stack 212 animate and the images in the second stack 214 do not animate when the first slider 302 is moved horizontally along the slide bar 300. The first slider 302 includes the Page identifier 308 which shows a Page number representing the position of the shown image (or Page) in the sequential order of the images (or Pages). The Page identifier 308 changes to match with the image shown on the top of the first stack 212, as the image shown on the top of the first stack 212 is changed.

The images in the second stack 214 animate and the images in the first stack 212 do not animate when the second slider 304 is moved horizontally along the slide bar 300. The second slider 304 includes the Page identifier 310 which shows a Page number representing the position of the shown image (or Page) in the sequential order of the images (or Pages). The Page identifier 310 changes to match with the image shown on the top of the second stack 214, as the image shown on the top of the second stack 214 is changed.

By using the first and second sliders 302, 304 independently, any two images can be displayed side by side in the Event Flow user interface 112. Further, any image which appears on the first stack 212 precedes the image which appears on the second stack 214 in the overall sequence of the images. Thus, the sequence of the images can be kept intact throughout all browsing and viewing manipulations that can occur using the multipart slide controller 402. The slide bar 300 includes equally spaced divisions 307, with each of the divisions 307 for a particular Page in the sequence of Pages. Each of the sliders 302, 304 are sized to fit in one of the divisions 307.

A tandem slider, such as the tandem slider 306 shown in FIGS. 3A and 3B, is not displayed as a part of the multipart slide controller 402 in the Event Flow user interface 212 shown in FIG. 4. The tandem slider "appears," or is displayed, in the Event Flow user interface 212 when the first slider 302 and the second slider 304 are placed in adjacent divisions 307. When the tandem slider is displayed in the user interface 212, the multipart slide controller 402 can be used for changing the images shown in the stacks 212, 214 together according to the sequential order of the Pages or images using the tandem slider. Accordingly, images in both of the stacks 212, 214 can be animated and sequenced through using the tandem slider.

Figure 5:
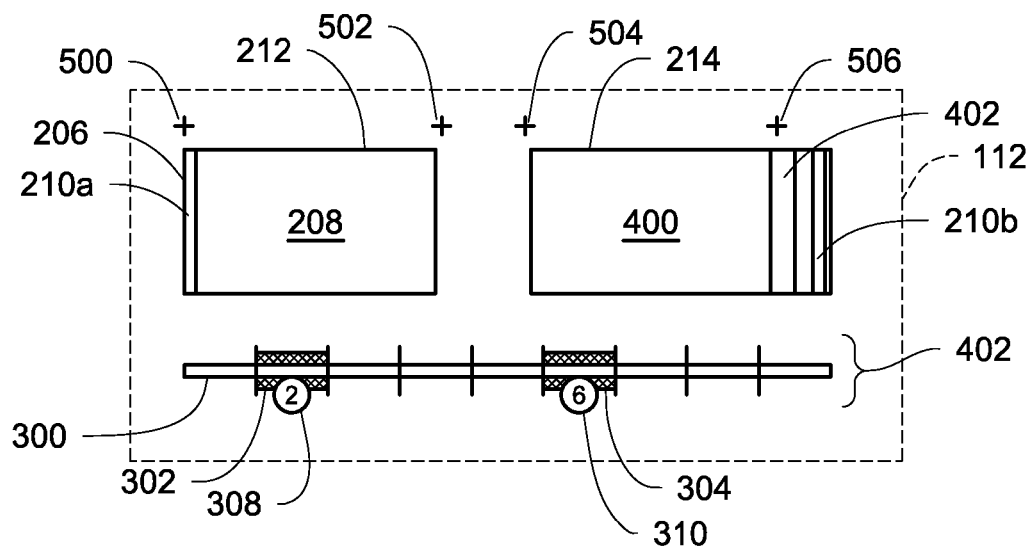

FIG. 5 shows add Page buttons 500, 502, 504, 506 displayed in the Event Flow user interface 112. Clicking the add Page button 500 creates a blank image associated with a blank Page immediately prior to the image shown on top of the first stack 212. Accordingly, in the example shown in FIG. 5, clicking the add Page button 500 adds a blank image associated with a blank Page between the Page associated with the first image 206 and the Page associated with the second image 208.

Clicking the add Page button 502 creates a blank image associated with a blank Page immediately after the image shown on top of the first stack 212. Accordingly, in the example shown in FIG. 5, clicking the add Page button 502 adds a blank image associated with a blank Page immediately after the second image 208.

Clicking the add Page button 504 creates a blank image associated with a blank Page immediately prior to the image shown on top of the second stack 214. Accordingly, in the example shown in FIG. 5, clicking the add Page button 504 adds a blank image associated with a blank Page immediately prior to the Page associated with the sixth image 400. The sixth image 400 is the sixth in the overall sequence of Pages, which includes both first and second stacks 212, 214, and the position of the sixth image 400 in the overall sequence is displayed by the position of the second slider 304 on the slide bar 300. The position of the sixth image 400 is also displayed in the second Page identifier 310.

Clicking the add Page button 506 creates a blank image associated with a blank Page immediately after the image shown on top of the first stack 212. Accordingly, in the example shown in FIG. 5, clicking the add Page button 506 adds a blank image associated with a blank Page immediately after the Page associated with the sixth image 400, e.g. the added image is between the sixth image 400 and the image 402 behind it in the second stack 214. FIG. 5 shows the multipart slide controller 402 similar to the one shown in FIG. 4 with similar components thereof.

Figure 6:
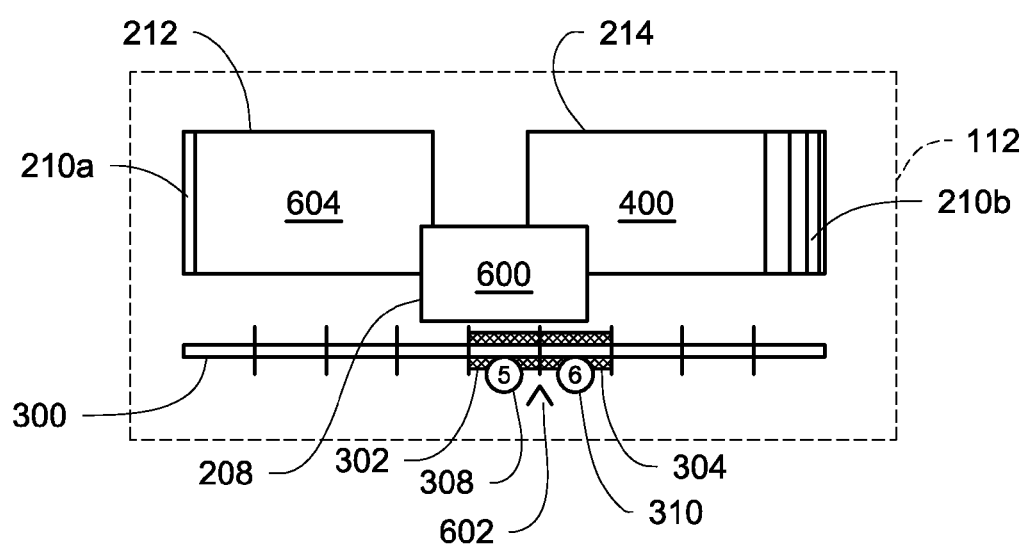

FIG. 6 shows an example of the Event Flow user interface 112 wherein the second image 208 from one of the first or second stacks 212, 214 is selected, dragged out and away from the stack 212, 214, and dropped on to the multipart slide controller 402 for moving the selected Page associated with the second image 208 to a different location in the sequence of Pages. When the second image 208 is selected and dragged, an image 600 representing the selected Page is generated for being dragged by the user within the Event Flow user interface 112. The images of the first and second stacks 212, 214 are changed and animated to visually indicate that the selected second image 208 has been "removed" from the sequential order of the Pages while the user is dragging the image 600.

While the image 600 of the selected Page associated with the second image 208 is being dragged, the first and second sliders 302, 304 automatically move along the slide bar 300 from either side to a closest insertion point 602 in the sequence of the Pages. This visually displays both the Page associated with the fourth image 604 that would proceed and the Page associated with the sixth image 400 that would follow the selected second image 208 if the selected second image 208 is inserted at the particular insertion point 602 in the sequence.

When the user drops the image 600 of the selected Page associated with the second image 208 onto the multipart slide controller 402, the dragged image 600 is no longer displayed, but another Page is generated in one of the stacks at a place associated with the insertion point 602 in the sequence of Pages.

The Event Flow user interface 112 allows any Page to be edited or played instantly by clicking one or more icons or shift-clicking the particular Page displayed in the user interface 112. This can allow for instant functional testing of the selected Page without necessarily having to start from the beginning of an entire sequence of Pages. The rapid scrolling through the Pages of the Event Flow interface 112 can be achieved by automatically converting each of the images of live Pages to a bitmap format file, or other image file format. When the user indicates the intention to edit or play a particular Page, live, functional objects can quickly replace the bitmap image. When the user switches back to Event Flow browsing, the process is reversed and an updated bitmap image can be generated and stored to memory.

For example, the Event Flow user interface 112 can display at least two Pages, side-by-side. When the two Pages displayed via the Event Flow user interface 112 are image files of the actual Pages, a user can select to activate an editing mode of the Event Flow user interface 112 via, for example, a user gesture on a touchscreen, a command key on a keyboard or keypad, clicking an icon, or a combination thereof, etc. When the editing mode of the Event Flow user interface 112 is activated, then the image files are replace by the digital content (e.g., digital assets) of the two Pages in the Event Flow user interface 112, which allows the user to interact with, edit, modify, create, delete, etc. with the two Pages at the same time. In the editing mode, the user can create logic connecting between the digital content within each Page and/or across the two Pages. The two Pages may include any combination of a Master Page and/or an Event Page. The user can select to deactivate the editing mode of the Event Flow user interface 112 via, for example, a user gesture on a touchscreen, a command key on a keyboard or keypad, clicking an icon, or a combination thereof, etc.

FIG. 7A shows a flow chart of a process 700 for starting a project using an Event Flow user interface, such as the Event Flow user interface 212 described above. A computer executing the computer instructions waits for a user to initiate the start of the process 700 (702). Once started, the computer waits for the user to select open a project (704). Once the user has selected to open the project (704), the computer determines whether the project is new or not (706). If the opened project is a new project, then two blank Pages are generated (708). Alternatively, if the opened project is not a new project, then image files of existing Pages are retrieved from a memory (710). Next, a sequence of the images representing the Pages of the project are split into two image stacks, with a first image anchored at a bottom of the first stack and a last image anchored at the bottom of the second stack (712). Thus, the "first anchor" is the image associated with the first Page in the sequence of Pages of the project, and the "second anchor" is the image associated with the last Page in the sequence of Pages of the project. Next, intermediate images are stacked (714). If the project selected is not a new project, the Pages can be positioned as positioned during a previous session by the user. Next, a slide bar is generated (716). The slide bar includes equally spaced divisions, one division for each Page in the sequence. Next, two separate sliders are generated and displayed on the slide bar (718). Then the computer determines whether the two sliders are adjacent to each other (720). If the two sliders are adjacent to each other, a tandem slider is generated and displayed on the slide bar (722). Then the process 700 is done (724).

Figure 7B:
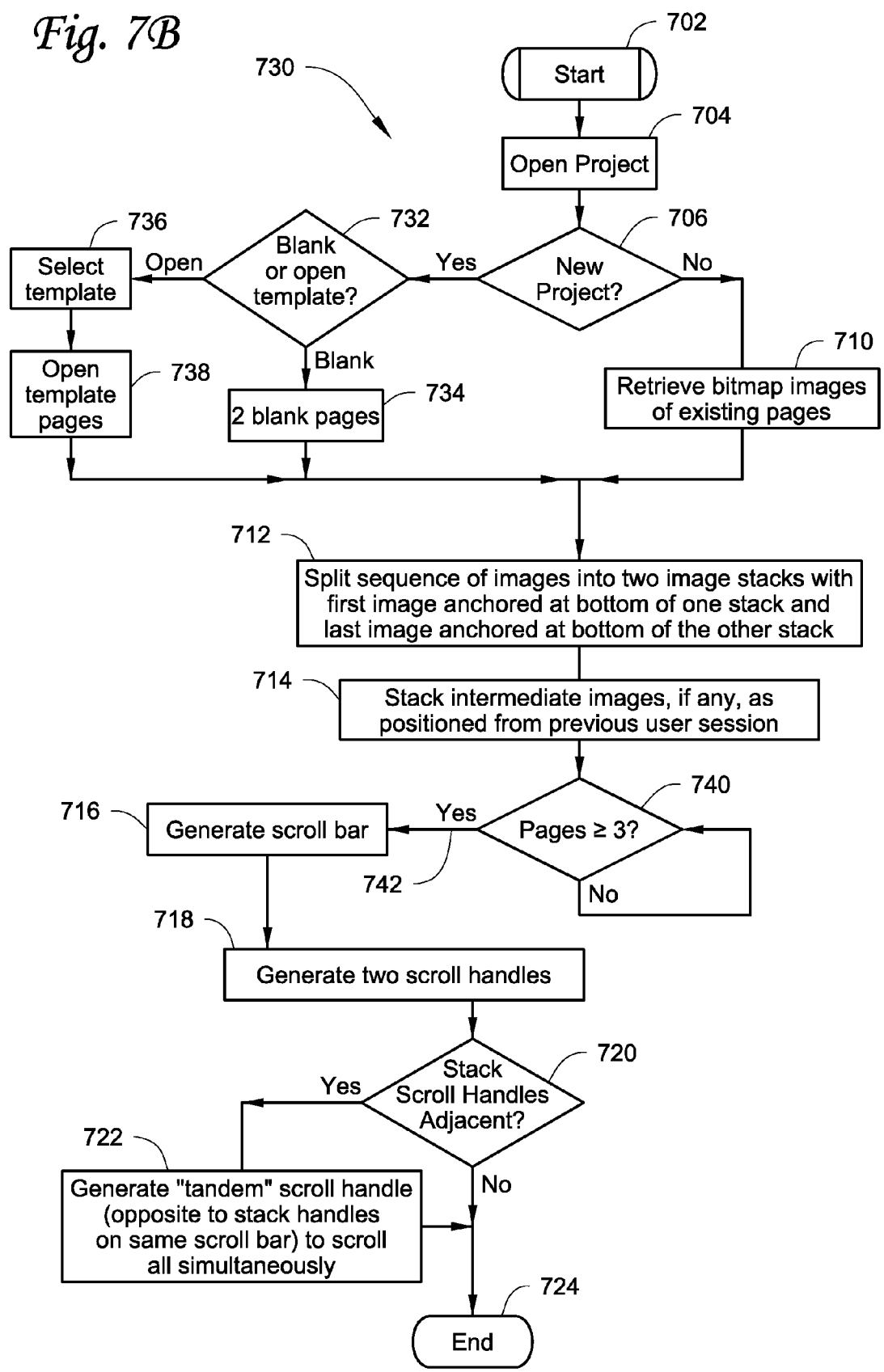
FIG. 7B shows a flow diagram for the initializing setup for the Event Flow user interface according to one embodiment.

FIG. 7B shows a flow chart of another embodiment of a process 730 for starting a project using an Event Flow user interface, similar to the process 700 described above. A computer executing the computer instructions waits for a user to initiate the start of the process 730 (702). Once started, the computer waits for the user to select open a project (704). Once the user has selected to open the project (704), the computer determines whether the project is new or not (706). If the opened project is a new project, then the user is prompted by the process 730 to select whether a blank project is to be opened or whether a template for the new project is to be opened (732). If the user selects to open the blank project, then two blank Pages are generated and displayed (734). If the user selects to open the template, then the user is prompted to select which template file is to be opened (736). The process 730 causes the Event Flow user interface to wait for the user to make the template file selection, and upon detection of the user's selection of the template file, the selected template pages are generated based upon the selected template file (738).

Alternatively, if the opened project is not a new project, then image files of existing Pages are retrieved from a memory (710). Next, a sequence of the images representing the Pages of the project are split into two image stacks, with a first image anchored at a bottom of the first stack and a last image anchored at the bottom of the second stack (712). Thus, the "first anchor" is the image associated with the first Page in the sequence of Pages of the project, and the "second anchor" is the image associated with the last Page in the sequence of Pages of the project. Next, intermediate images are stacked (714). If the project selected is not a new project, the Pages can be positioned as positioned during a previous session by the user.

A slide bar is not generated if the number of Pages displayed is two or fewer (contrary to step 716 of the process 700 of FIG. 7A) (740).

When the user interacts with the Even Flow user interface to create a total of three or more Pages, i.e., one master page and two event pages or two master pages and one event page, etc., the slide bar and slide bars are generated and displayed (742).

The slide bar includes equally spaced divisions, one division for each Page in the sequence. Next, two separate sliders are generated and displayed on the slide bar (718). Then the computer determines whether the two sliders are adjacent to each other (720). If the two sliders are adjacent to each other, a tandem slider is generated and displayed on the slide bar (722). Then the process 730 is completed (724).

Figure 8:
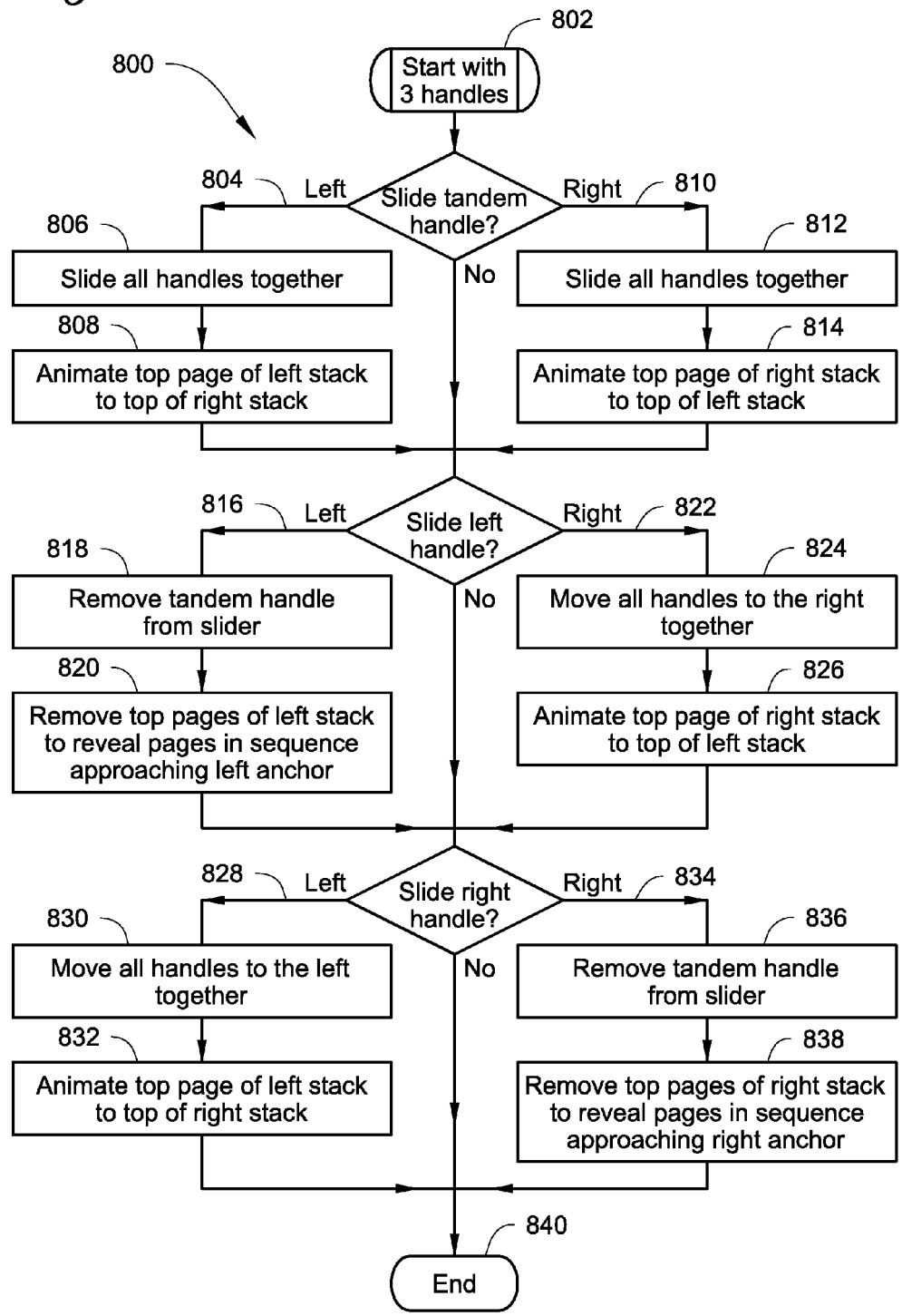
FIG. 8 shows a flow diagram for browsing through Pages for the Event Flow user interface according to an embodiment.

FIG. 8 shows an example flow chart for a browsing process 800 for Page browsing in an Event Flow user interface, such as the Event Flow user interface 212 described above, when three sliders (a first slider, a second slider, and a tandem slider) are already displayed within the Event Flow user interface. The project has already been opened according to, for example, the process 700 shown in FIG. 7A or the process 730 shown in FIG. 7B. The computer starts the browsing process 800 and waits for the user to move one of the three sliders (802).

If the computer determines that the tandem slider is being moved to the left (804), then all three sliders are moved together to the left along the slide bar (806), and an image on the top of the first stack is animated to move to the top of the second stack (808).

If the computer determines that the tandem slider is being moved to the right (810), then all three sliders are moved together to the right along the slide bar (812), and an image on the top of the second stack is animated to move to the top of the first stack (814).

If the computer determines that the first slider is being moved to the left (816), then the tandem slider is no longer displayed (818), and an image on the top of the first stack is removed to reveal an image preceding the removed image according to the order in sequence approaching the first anchor (820).

If the computer determines that the first slider is being moved to the right (822), then all three sliders are moved together to the right along the slide bar (824), and an image on the top of the second stack is animated to move to the top of the first stack (826).

If the computer determines that the second slider is being moved to the left (828), then all three sliders are moved together to the left along the slide bar (830), and an image on the top of the first stack is animated to move to the top of the second stack (832).

If the computer determines that the second slider is being moved to the right (834), then the tandem slider is no longer displayed (836), and an image on the top of the second stack is removed to reveal an image following the removed image according to the order in sequence approaching the second anchor (838).

The browsing process 800 continues until the computer receives an instruction to end the browsing process 800 (840).

Figure 9:
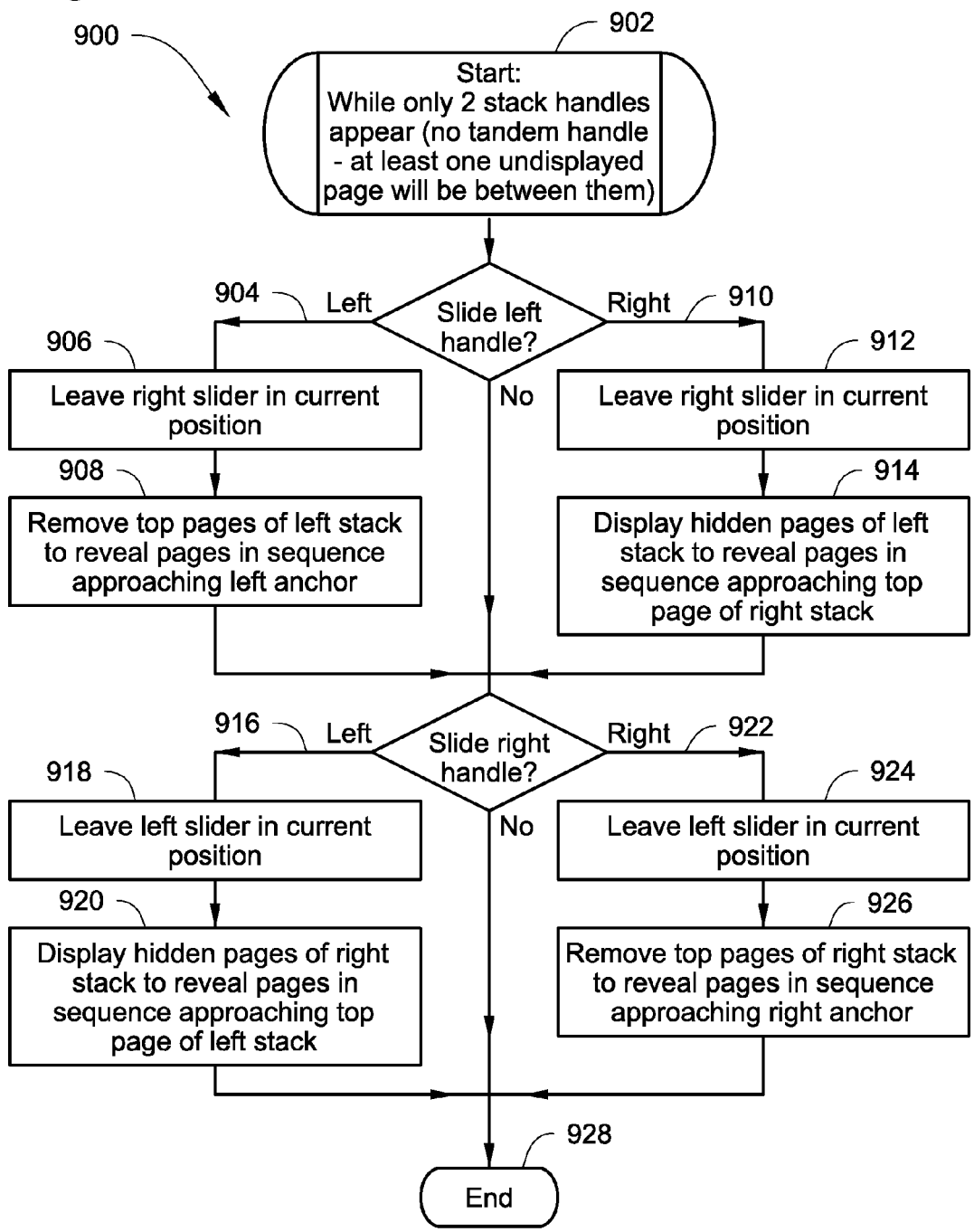
FIG. 9 shows a flow diagram for browsing through the Pages of the stacks separately for the Event Flow user interface according to an embodiment.

FIG. 9 shows an example flow chart for a browsing process 900 for Page browsing in an Event Flow user interface, such as the Event Flow user interface 212 described above, when a tandem slider is not displayed. The tandem slider is not displayed in the Event Flow user interface when at least one Page separates the two Pages being displayed as first and second images on the respective tops of the first and second stacks. In another example, the tandem slider is not displayed when the first slider and the second slider are not adjacent to each other, e.g. there is at least one empty division between the first and second sliders.

The browsing process 900 begins after a project has already been opened according to, for example, the process 700 shown in FIG. 7A or the process 730 shown in FIG. 7B. Two sliders (a first slider and a second slider) are already displayed within the Event Flow user interface. The computer initiates the browsing process 900 when the tandem slider is not being displayed. The computer starts the browsing process 900 and waits for the user to move one of the two sliders (902).

If the computer determines that the first slider is being moved to the left (904), then the second slider is not moved from its current position (906). The image on the top of the first stack is removed from the first stack according to a sequence approaching the first anchor (908).

If the computer determines that the first slider is being moved to the right (910), then the second slider is not moved from its current position (912). Then an image associated with a hidden Page is revealed and displayed at the top of the first stack, approaching an image on the top of the second stack (914).

If the computer determines that the second slider is being moved to the left (916), then the first slider is not moved from its current position (918). Then an image associated with a hidden Page is revealed and displayed at the top of the second stack, approaching an image on the top of the first stack (920).

If the computer determines that the second slider is being moved to the right (922), then the first slider is not moved from its current position (924). The image on the top of the second stack is removed from the second stack according to a sequence approaching the second anchor (926).

The browsing process 900 continues until the computer receives an instruction to end the browsing process 900 (928).

Figure 10:
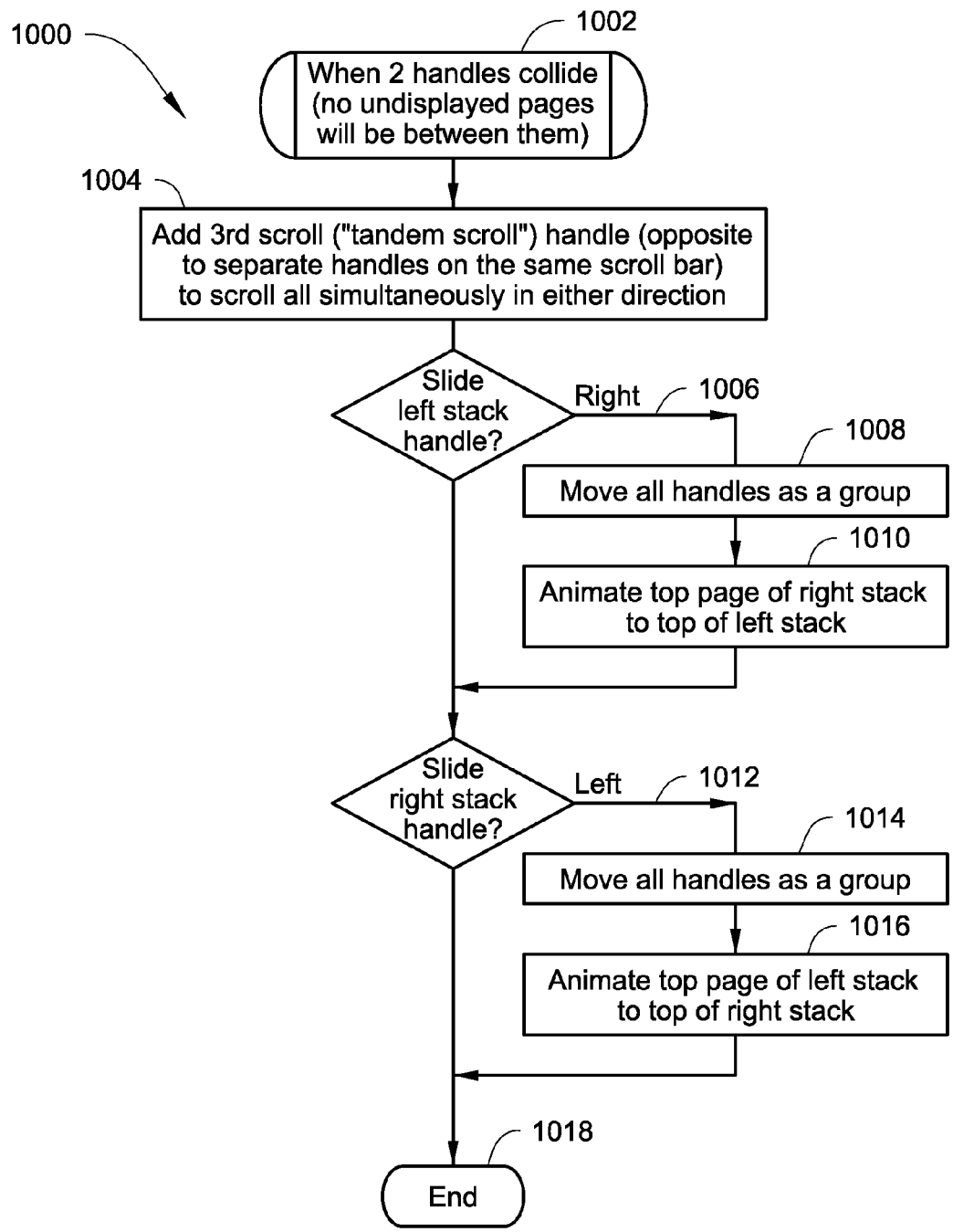
FIG. 10 shows a flow diagram for changing the browsing mode to tandem browsing for the Event Flow user interface according to an embodiment.

FIG. 10 shows a flow chart for a transition process 1000 for changing to a tandem browsing process from an independent browsing process using an Event Flow user interface, such as the Event Flow user interface 212 described above. The transition process 1000 begins after a project has already been opened according to, for example, the process 700 shown in FIG. 7A or the process 730 shown in FIG. 7B. Two sliders (a first slider and a second slider) are already displayed within the Event Flow user interface. The computer has initiated a browsing process 900 and the tandem slider is not being displayed. The computer waits for the user to move one of the two sliders.

The computer waits until the first and second sliders are immediately adjacent to each other (1002) and generates and displays the tandem slider on the slide bar (1004). The computer can determine whether the user has moved one of the first or second sliders along the slide bar in such a way that the first and second sliders have "collided." In other words, the computer can determine whether there are no hidden Pages between the Pages associated with the positions of the first and second sliders.

The computer can determine whether the first slider is being moved to the right (1006). If the computer determines that the first slider is being moved to the right (1006), then the three sliders (the first slider, the second slider, and the tandem slider) are moved together as a group to the right along the slide bar (1008). An image at the top of the second stack is animated to move to the top of the first stack (1010).

The computer can determine whether the second slider is being moved to the left (1012). If the computer determines that the second slider is being moved to the left (1012), then the three sliders (the first slider, the second slider, and the tandem slider) are moved together as a group to the left along the slide bar (1014). An image at the top of the first stack is animated to move to the top of the second stack (1016).

The transition process 1000 continues until the computer receives an instruction to end the transition process 1000 (1018).

Figure 11:
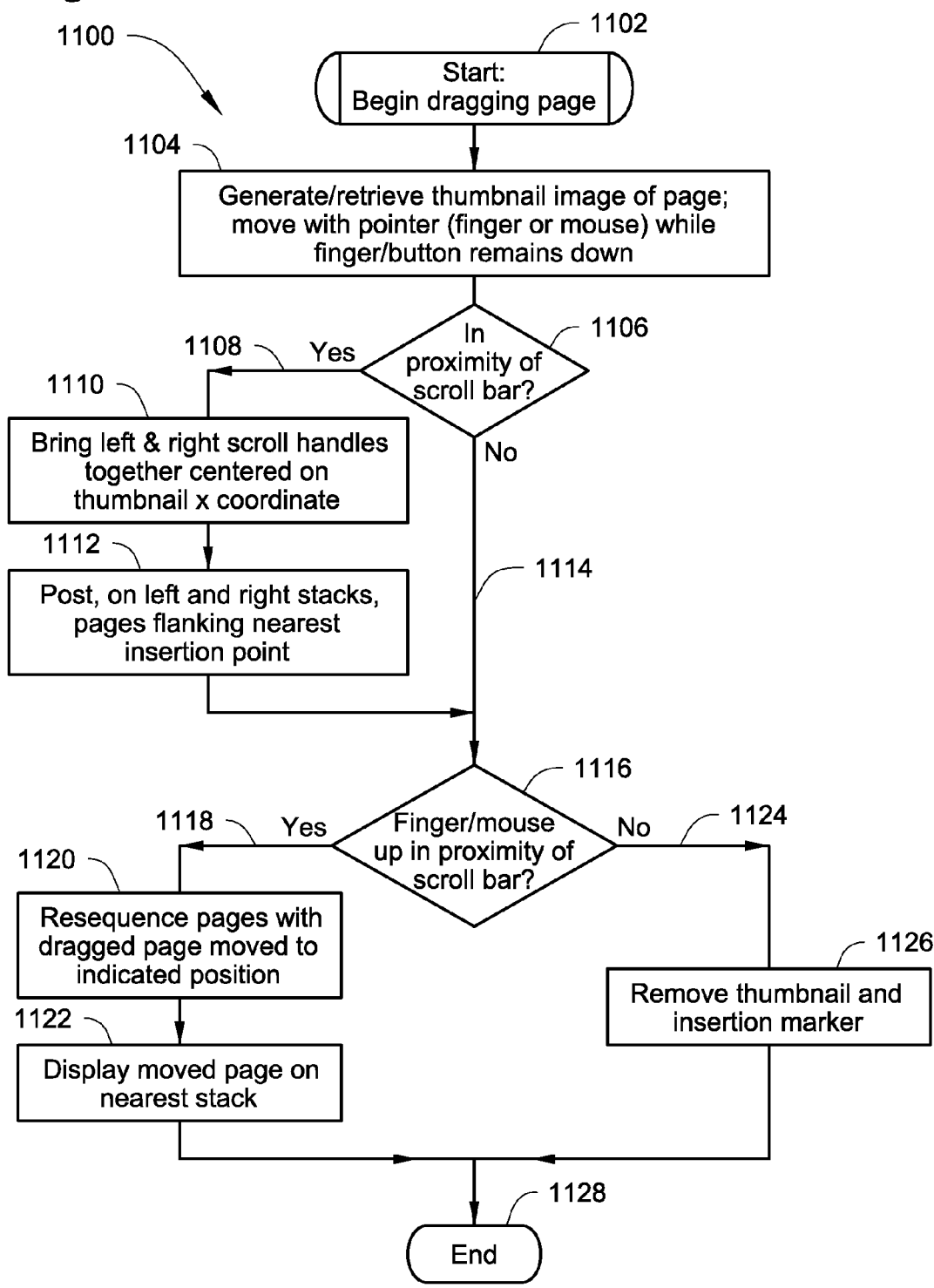
FIG. 11 shows a flow diagram for changing the sequence of the Pages for the Event Flow user interface according to an embodiment.

FIG. 11 shows a flow chart for a resequencing process 1100 for changing the sequence of Pages in a project using an Event Flow user interface, such as the Event Flow user interface 212 described above. The resequencing process 1100 begins after a project has already been opened according to, for example, the process 700 shown in FIG. 7A or the process 730 shown in FIG. 7B. Two sliders (a first slider and a second slider) are already displayed within the Event Flow user interface. When the computer receives an instruction to initiate the process 1100, the tandem slider is displayed if it had not already been displayed. The computer waits for the user to select an image from one of first or second stacks and drag and drop the selected image onto a particular insertion point on the slide bar.

The computer determines that the user has selected the image from one of the first or second stacks and the image is being dragged along the Event Flow user interface (1102). The computer generates or retrieves from memory an image representing the selected Page for being dragged by generating a thumbnail image of the selected Page (1104). If the thumbnail image is generated, the thumbnail image is stored to memory. The computer then displays the thumbnail image within the Event Flow user interface. For example, the thumbnail image can be dragged by the user using a mouse & cursor combination.

The computer then determines whether the thumbnail image being dragged is near or in proximity of the slide bar (1106). If the computer determines that the thumbnail image being dragged is indeed near the slide bar (1108), then the first and the second sliders are animated to move along the slide bar towards a general position of the thumbnail image being dragged, which is also identified to be an insertion point (1110) and the tandem slider appears. Then, the computer animates the first and the second stacks so that that the image on the top of the first stack and the image on the top of the second stack flank the insertion point (1112).

Then, the computer determines whether the thumbnail image being dragged is dropped near the slide bar (1116). If the computer determines that the thumbnail image being dragged is dropped near the slide bar (1118), then the sequence of Pages is changed to reflect a new sequence of Pages (1120). The new sequence of Pages is in accordance with the thumbnail image that is associated with a particular Page being moved and inserted between the images that flank the insertion point. In other words, by moving the thumbnail image from one location in one of the stacks to a particular insertion point on the slide bar, the sequence of Pages has changed to the new sequence of Pages.

Then the images and the first and second stacks are changed to display the inserted image on the top of one of the stacks in accordance with the new sequence of Pages (1122).

If the thumbnail image being dragged is dropped but not near the slide bar (1124), then the thumbnail image and the insertion marker are no longer displayed (1126).

The computer continues the above process 1100 until the process 1100 for changing the sequencing of the Pages ends (1128).

Figure 12:
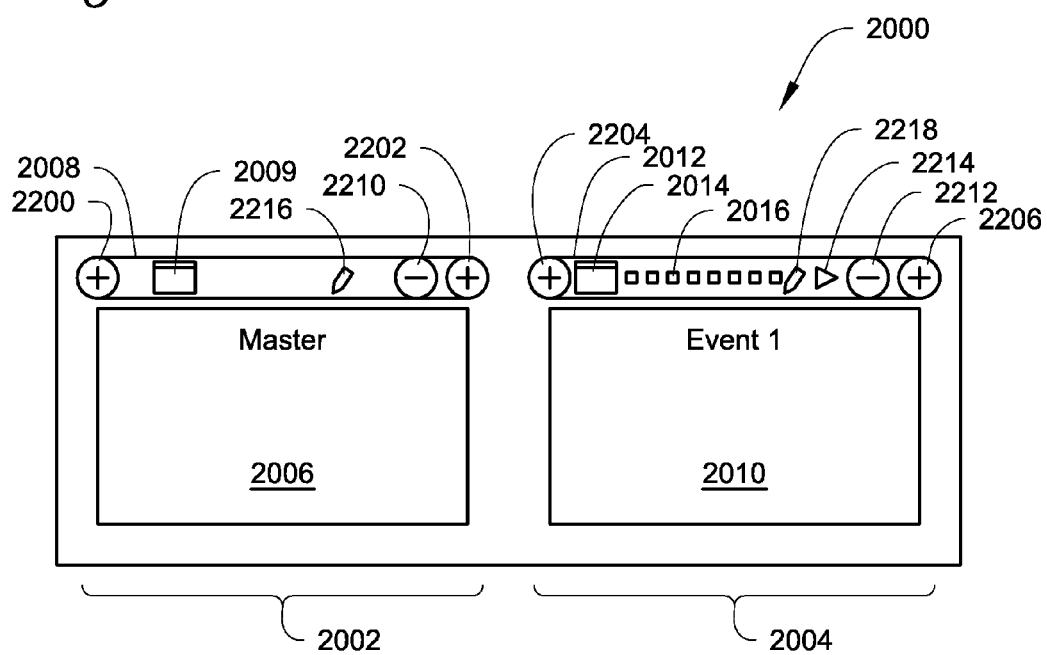
FIG. 12 shows an embodiment of the user interface as displayed on a display.

FIG. 12 shows an Event Flow user interface 2000 that can use one or more Master Pages and one or more Event Pages. A Master Page is a type of Page that can be assigned to one or more of the Event Pages. When a Master Page is assigned to an Event Page, the contents of the Master Page are included in the Event Page. A project displayed in the Event Flow user interface 2000 can have one or more Master Pages. Images associated with the one or more Master Pages can be displayed as stacks of images, similar to the stacks of images described above. Also, a project displayed in the Event Flow user interface 2000 can have one or more Event Pages. Images associated with the one or more Event Pages can also be displayed as stacks of images, similar to the stacks of images described above.

The Event Flow user interface 2000 includes a first view portion 2002 and a second view portion 2004. The first view portion 2002 is provided on one side of the user interface 2000 and can display an image associated with a Master Page or an Event Page. For example, as shown in FIG. 12, the first view portion 2002 includes a first image 2006 associated with a Master Page.

The second view portion 2004 is provided on another side of the user interface 2000 and is side-by-side with the first view portion 2002. The second view portion 2004 can display an image associated with a Master Page or an Event Page. For example, as shown in FIG. 12, the second view portion 2004 includes a second image 2010 associated with an Event Page.

When an image associated with a Master Page is shown in the first view portion 2002 or the second view portion 2004, a Master Page title bar 2008 is included in the respective view portion 2002, 2004. For example, since the first image 2006 is associated with a Master Page, the first view portion 2002 includes the Master Page title bar 2008.

The Master Page title bar 2008 indicates whether the Master Page shown in the respective view portion 2002, 2004 is identified as a "Background Master" or identified as a "Foreground Master". For example, the Master Page title bar 2008 indicates that the Master Page associated with the first image 2006 is identified as a "Background Master".

The "Background Master" identification indicates that the contents of a particular Master Page can be included in the background of any Event Page that is selected to be assigned with the particular Mater Page. The "Foreground Master" identification indicates that the contents of the particular Master Page can be included in the foreground of any Event Page that is selected to be assigned with the particular Master Page.

The Master Page title bar 2008 also includes a Master Page position icon 2009. The Master Page position icon 2009 allows a user to select whether the Master Page is a "Background Master" or a "Foreground Master".

When an image associated with an Event Page is shown in the first view portion 2002 or the second view portion 2004, an Event Page title bar 2012 is included in the respective view portion 2002, 2004. For example, since the second image 2010 is associated with an Event Page, the second view portion 2004 includes the Event Page title bar 2012.

The Event Page title bar 2012 includes one or more Master Page Icons 2014, 2016. The sequential order of the Master Page Icons 2014, 2016 visually represents the number of Master Pages created in the particular project and the sequential location of each of the Master Pages within the Pages of the project. Each of the Master Page Icons 2014, 2016 provides a visual indicator (e.g., a filled rectangle or an unfilled rectangle) that shows whether a particular Master Page is assigned to the Event Page shown in the respective view portion 2002, 2004. For example, the Master Page Icon 2014 indicates that the first Master Page associated with the first image 2006 is assigned to the Event Page associated with the second image 2010. In contrast, the Master Page Icon 2016 indicates that the other Master Page in the project is not assigned to the Event Page associated with the second image 2010.

A user can select whether a particular Master Page of the project is to be assigned to a particular Event Page by selecting or deselecting the Master Page Icon 2014, 2016 associated with the particular Master Page. The user's selection with each of the Master Page Icons 2014, 2016 is detected by the Event Flow user interface 2000 for assigning or unassigning a particular Master Page to the Event Page. Each Event Page can be assigned with one or more Master Pages. Optionally, in some embodiments, a Master Page can be assigned to another Master Page.

The Event Flow user interface 2000 provides a way for a user to assign a Master Page, with all of the contents in the Master Page, to one or more Event Pages. For example, the second image 2010 can be updated as one or more of the Master Page Icons 2014, 2016 are selected or unselected by a user. Selection can be detected by detecting a rolling over of the Master Page Icons 2014, 2016 by a cursor controlled by the user. When rolling over a particular Master Page Icon 2014, 2016, the rolling over can be detected by the user interface 2000 and the second image 2010 is updated to display the contents of the Master Page associated with that particular Master Page Icon 2014, 2016. At this time, the displayed image is merely a visual indicator of what the contents of the Event Page would look like if the Master Page assignment is made. There has not been an assignment made between the Event Page and the Master Page during the rolling over of the Master Page Icon 2014, 2016. When the selected Master Page Icon 2014, 2016 is selected, for example, by clicking an input button of a mouse device, the assignment of the selected Master Page to the Event Page associated with the second image 2010 is made and that assignment is saved to memory.

The Master Page and Event Page title bars 2008, 2012 of the Event Flow user interface 2000 also include Page buttons 2200, 2202, 2204, 2206 which are similar in function to the respective add Page buttons 500, 502, 504, 506 of FIG. 5 described above.

The Master Page and Event Page title bars 2008, 2012 of the Event Flow user interface 2000 also include delete Page buttons 2210, 2212 which allow a user to delete the Page provided in the respective first and second view portions 2002, 2004. For example, when a user selects the delete Page button 2210, the Page associated with the first image 2006 is removed. Also, the first image 2006 is removed from the first stack shown in the first view portion 2002. When a user selects the delete Page button 2212, the Page associated with the second image 2010 is deleted. Also, the second image 2010 is removed from the second stack shown in the second view portion 2004.

The Event Page title bar 2012 also includes a run mode button 2214, which switches the Event Flow user interface 200 to a run mode for the particular Event Page.

Also, the Master Page and Event Page title bars 2008, 2012 each include an edit mode button 2216, 2218, which switches the Event Flow user interface 2000 to an edit mode for the particular Page.

When in edit mode for a Master Page, the contents of the Master Page are editable. When in edit mode for an Event Page, the contents of the Event Page are editable, and the contents of the Master Page assigned to the Event Page are shown, either as background or foreground content, as indicated by the identification on the Master Page title bar of the assigned Master Page. The contents of the Master Page included in the Event Page are protected when the Event Page is in edit mode. In one embodiment, a user can switch from an edit mode of the Event Page to an edit mode of a Master Page, for example, by double clicking content of the Master Page included in the Event Page from the edit mode of the Event Page.

Examples of a run mode and an edit mode are described, for example, in PCT Application No. PCT/US2011/038943 filed on Jun. 2, 2011, titled "DEVICE HAVING GRAPHICAL USER INTERFACES AND METHOD FOR DEVELOPING MULTIMEDIA COMPUTER APPLICATIONS."

According to the process 730 shown in FIG. 7B, the horizontal slide bar and scrolling sliders are not displayed when the Event Flow user interface 2000 displays only two Pages.

Figure 13:
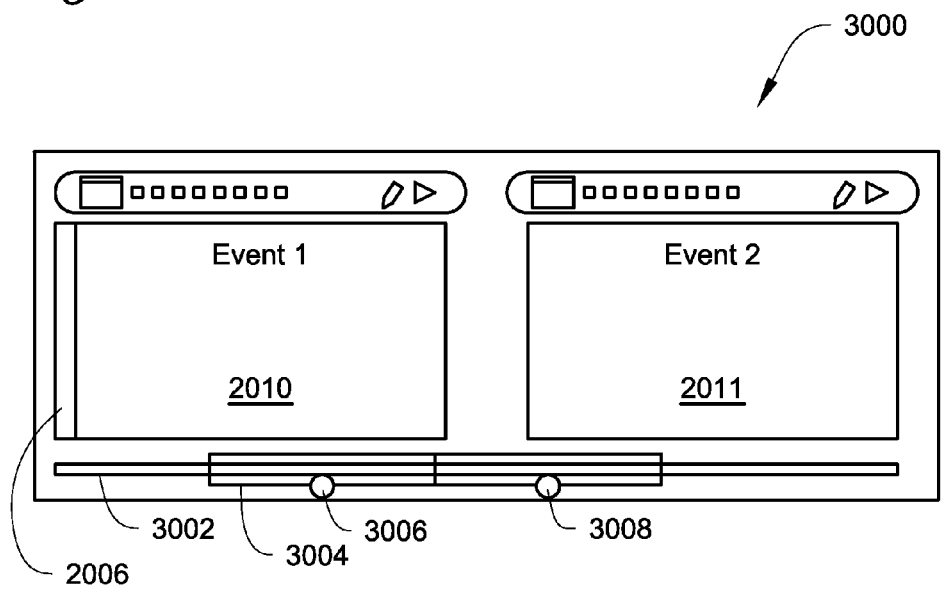
FIG. 13 shows an embodiment of the user interface as displayed on a display.

FIG. 13 shows an example of the Event Flow user interface 3000 that is similar to the example Event Flow user interface 2000. The Event Flow user interface 3000 displays more than two Pages. That is, the Event Flow user interface 3000 shows one Master Page 2006 and two Event Pages 2010, 2011. The Event Flow user interface 3000 is not limited to only the one Master Page 2006 and two Event Pages 2010, 2011. Accordingly, the Event Flow user interface 3000 can have more than the one Master Page 2006 and/or two Event Pages 2010, 2011. The Event Flow user interface 3000 displays three or more Pages. Accordingly, according to the process 730 shown in FIG. 7B, a horizontal slide bar 3002 and sliders 3004, 3006, 3008 are displayed. The horizontal slide bar 3002 is similar to the horizontal slide bar 300 shown in FIG. 3A. The slider 3004 is similar to the slider 302 shown in FIG. 3A. The slider 3006 is similar to the slider 308 shown in FIG. 3A. The slider 3008 is similar to the slider 310 shown in FIG. 3A.

Figure 14:
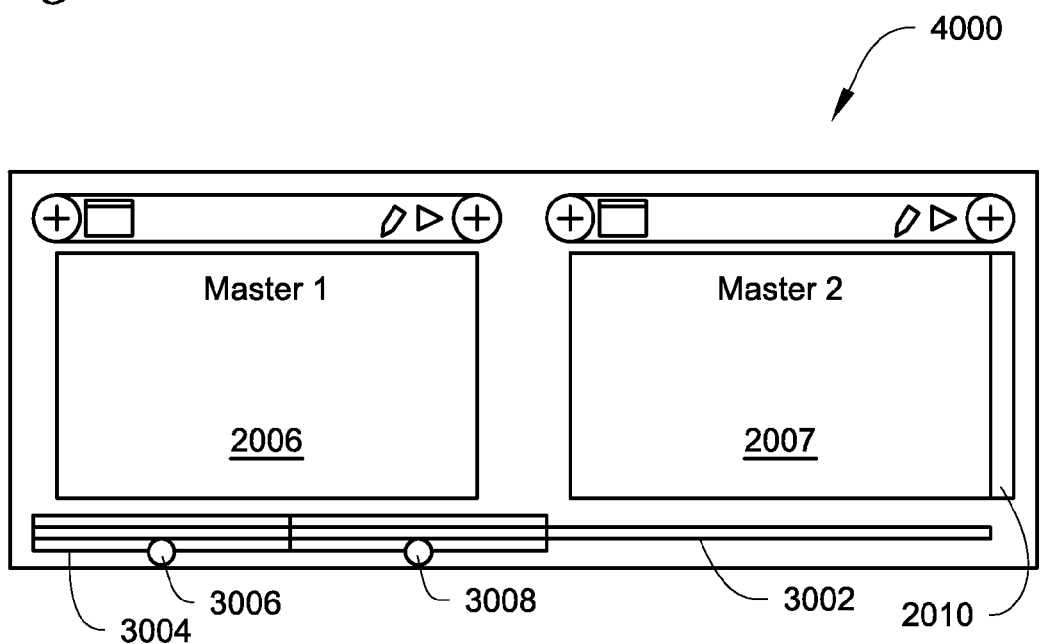
FIG. 14 shows an embodiment of the user interface as displayed on a display.

FIG. 14 shows an example of the Event Flow user interface 3000 that is similar to the example Event Flow user interface 2000 and/or the Event Flow user interface 3000. The Event Flow user interface 4000 displays more than two Pages. That is, the Event Flow user interface 4000 shows two Master Pages 2006, 2007 and one Event Page 2010. The Event Flow user interface 4000 is not limited to only the two Master Pages 2006, 2007 and one Event Page 2010. Accordingly, the Event Flow user interface 4000 can have more than the two Master Pages 2006, 2007 and/or one Event Page 2010. The Event Flow user interface 4000 displays three or more Pages. Accordingly, according to the process 730 shown in FIG. 7B, the horizontal slide bar 3002 and sliders 3004, 3006, 3008 are displayed.

Figure 15:
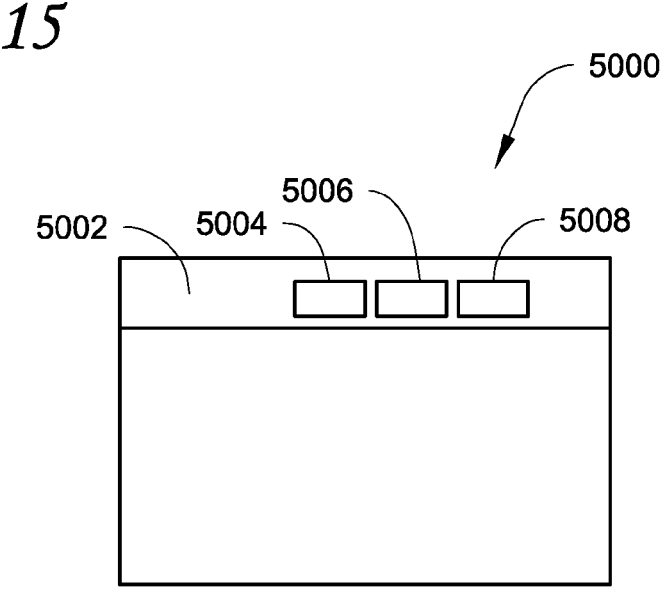
FIG. 15 shows an embodiment of a Master Page being edited.

FIGS. 15-18 show an example of editing a Master Page from within an Event Page. FIG. 15 shows an example of the Master Page 5000 being edited after a Master Page (2006 shown in FIG. 12-14 or 2007 shown in FIG. 14) has been selected by a user via the Event Flow user interface (2000 in FIG. 12, 3000 in FIG. 13, or 4000 in FIG. 14). The Master Page 5000 has been selected to be a Foreground Master. Accordingly, one or more graphical elements created in (or contained in) the Master Page 5000 will show on top of (or in front of) other graphical elements contained in an Event Page. The Master Page 5000 could have been selected to be a Background Master, in which case the one or more graphical elements created in (or contained in) the Master Page 5000 would have been shown on the bottom of (or in back of) other graphical elements contained in an Event Page.

The Master Page 5000 has been edited (or modified) with graphical elements that have been created and/or added by the user. The graphical elements include a horizontal bar 5002 positioned at the top of the window. The horizontal bar 5002 includes three interactive elements (e.g., buttons) 5004, 5006, 5008 also positioned at the top of the window.

Figure 16:
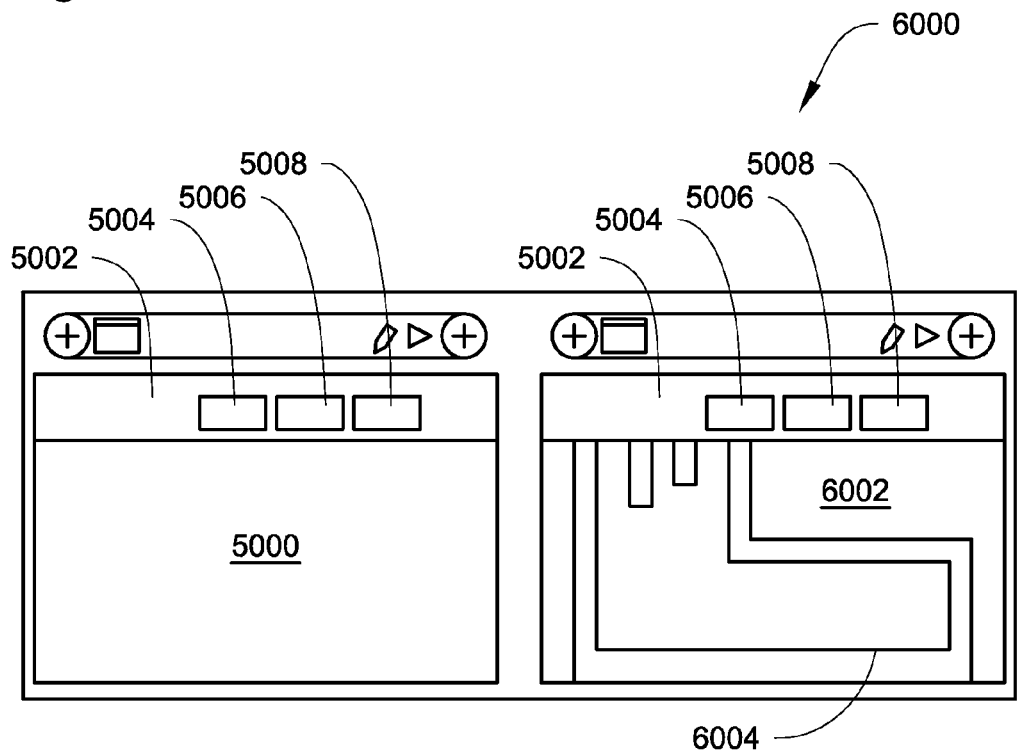
FIG. 16 shows an embodiment of the user interface, showing the Master Page and an Event Page after the Master Page has been edited from FIG. 15.

FIG. 16 shows an example of the Event Flow user interface 6000, showing the Master Page 5000 and an Event Page 6002 after the Master Page 5000 has been edited, as shown in FIG. 15. The horizontal bar 5002 positioned at the top of the window, including the three buttons 5004, 5006, 5008 contained in the Master Page 5000 also show on top of (or in front of) other graphical elements 6004 contained in the Event Page 6002. Any changes to the horizontal bar 5002 and the three buttons 5004, 5006, 5008 made in the Master Page 5000 is applied to the horizontal bar 5002 and the three buttons 5004, 5006, 5008 shown in the Event Page 6002.

Figure 17A:
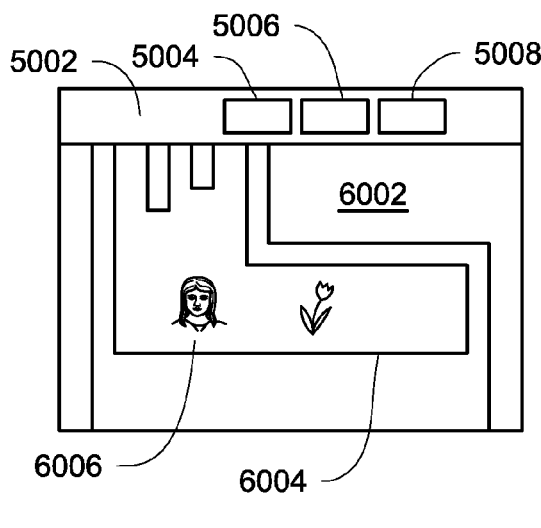
FIG. 17A shows an embodiment of the Event Page being edited.
Figure 17B:
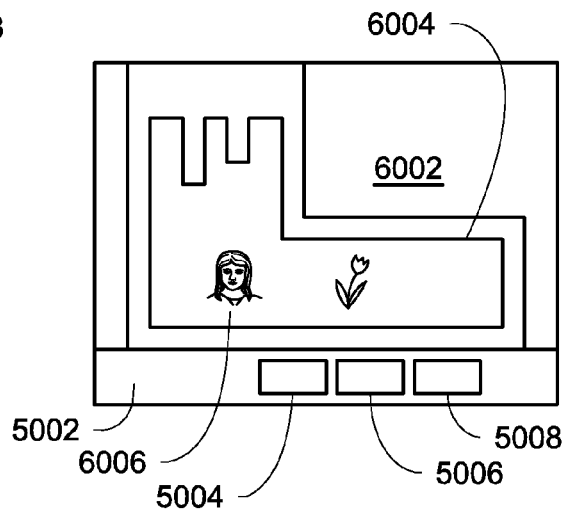
FIG. 17B shows the result of the edited Event Page edited from FIG. 17A.

FIGS. 17A and 17B show an example of the Event Page 6002 being edited and/or modified after the Event Page 6002 has been selected by the user from, for example, the Event Flow user interface 6000 shown in FIG. 16.

FIG. 17A shows additional graphical elements 6006 which have been added to the Event Page 6002. The Event Page 6002 shows the horizontal bar 5002 and the three buttons 5004, 5006, 5008 made in the Master Page 5000 being displayed at the top of the window, as configured by the user when the user interacted with the Master Page 5000 (shown in FIG. 15). While the user is interacting with the Event Page 6002, the user is provided with interactive elements (e.g., icons), which the user can select to activate an editing mode of the Master Page elements that are shown in the Event Page 6002. Accordingly, when the user selects to activate the editing mode of the Master Page elements, such as the horizontal bar 5002 and the three buttons 5004, 5006, 5008, the user can modify them from within the Event Page 6002. The user does not necessarily have to move or select the Master Page (5000 shown in FIGS. 15 and 16) in order to modify he Master Page elements, such as the horizontal bar 5002 and the three buttons 5004, 5006, 5008. An example of the interactive elements for activating the editing mode of the Master Page elements from within the Event Page 6002 can be, for example, a pencil icon shown above the Event Page 6002, which when selected by the user, activates the editing mode of the Master Page elements from within the Event Page 6002. Selecting the pencil icon can deactivate the editing mode of the Master Page elements from within the Event Page 6002, preventing the Master Page elements from being modified inadvertently from within the Event Page 6002. FIG. 17B shows the horizontal bar 5002 and the three buttons 5004, 5006, 5008 having been modified so that the position of these Master Page elements 5002, 5004, 5006, 5008 have been changed to the bottom of the window.

Figure 18:
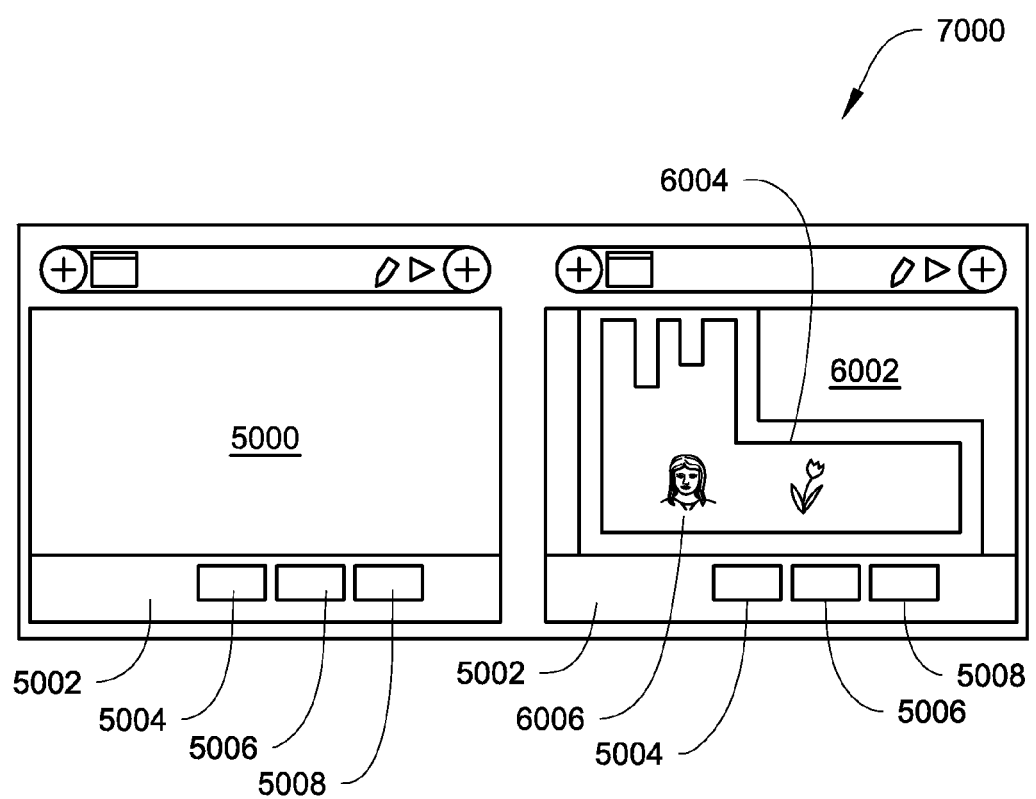
FIG. 18 shows an embodiment of the user interface as displayed on a display.

FIG. 18 shows an example of the Event Flow user interface 7000 as displayed on a display after the modification of the Master Page elements 5002, 5004, 5006, 5008 have been changed (e.g., edited) as shown in FIG. 17B. The changes to the Master Page elements 5002, 5004, 5006, 5008 made from within the Event Page 6002 has been also made to the Master Page 5000. Accordingly, the horizontal bar 5002 and the three buttons 5004, 5006, 5008 are positioned at the bottom of the window. It should be noted that the graphical elements 6006 which have been added to the Event Page 6002 are not shown in the Master Page 5000 because the graphical elements 6006 are graphical elements contained only in the Event Page 6002. That is, the graphical elements 6006 are not Master Page elements.

Aspects:

It is noted that any one or more of aspects 1-18 can be combined with any one or more of aspects 19 and/or 20.

1. A computer-implemented method, comprising:

displaying a graphical user interface on a display of a computer, wherein the graphical user interface includes:

a first view portion and a second view portion;

the first view portion includes a first image associated with a first digital content page stored in a memory of the computer; and the second view portion includes a second image associated with a second digital content page stored in the memory.

2. The computer-implemented method according to aspect 1, wherein the first view portion includes at least one more image, the at least one more image is associated with an additional digital content page stored in the memory, wherein the at least one more image is displayed stacked behind the first image, wherein the first image and the at least one more image form a first stacked images.

3. The computer-implemented method according to aspects 1-2, wherein the second view portion includes at least one more image, the at least one more image is associated with an additional digital content page stored in the memory, wherein the at least one more image is displayed stacked behind the second image, wherein the second image and the at least one more image form a second stacked images.

4. The computer-implemented method according to aspects 1-3, wherein the graphical user interface further comprises:
 a slide bar;
 a first slider associated with the slide bar for moving along the slide bar, the first slider controlling a first stacked order of the first stacked images;
 a second slider associated with the slide bar for moving along the slide bar, the second slider controlling a second stacked order of the second stacked images; and
 a tandem slider associated with the slide bar for moving along the slide bar, the tandem slider controlling both the first stacked order and the second stacked order together.

5. The computer-implemented method according to aspects 1-4, wherein the graphical user interface further comprises:
 a first page identifier displaying the first stacked order of a top image of the first stacked images, wherein the first page identifier dynamically changes as the first slider is moved along the slide bar and/or as the tandem slider is moved along the slide bar.

6. The computer-implemented method according to aspects 1-5, wherein the graphical user interface further comprises:
 a second page identifier displaying the second stacked order of a top image of the second stacked images, wherein the second page identifier dynamically changes as the second slider is moved along the slide bar and/or as the tandem slider is moved along the slide bar.

7. The computer-implemented method according to aspects 1-6, wherein the graphical user interface further comprises:
 a first page identifier displaying the first stacked order of a top image of the first stacked images, wherein the first page identifier dynamically changes as the first slider is moved along the slide bar and/or as the tandem slider is moved along the slide bar.

8. The computer-implemented method according to aspects 1-7, wherein the graphical user interface further comprises:
 one or more page creation buttons for adding another image associated with another page stored in the memory to the first stacked images.

9. The computer-implemented method according to aspects 1-7, wherein the graphical user interface further comprises:
 one or more page creation buttons for adding another images associated with another page stored in the memory to the second stacked images.

10. The computer-implemented method according to aspects 1-9, wherein the graphical user interface further comprises:
 one or more page creation buttons for adding another image associated with another page stored in the memory to the first stacked images.

11. The computer-implemented method according to aspects 1-10, wherein the graphical user interface further comprises:
 a drag-and-drop image which can be selected from the first or second stacked images and dropped into the second or first stacked images, wherein the displaying of the first and/or second stacked images change dynamically to display removal of the selected image by changing the first and/or second stacked order.

12. The computer-implemented method according to aspects 1-10, further comprising:
 displaying the slider bar only when the number of pages stored in the memory is more than two.

13. The computer-implemented method according to aspects 1-10, further comprising:
 displaying the slider bar when the number of pages stored in the memory is more than three.

14. The computer-implemented method according to aspects 1-10, further comprising:
 displaying the slider bar when the number of pages stored in the memory is equal to three.

15. The computer-implemented method according to aspects 1-10, further comprising:
 undisplaying the slider bar when the number of pages stored in the memory is fewer than three.

16. The computer-implemented method according to aspects 1-10, further comprising:
 undisplaying the slider bar when the number of pages stored in the memory is two.

17. The computer-implemented method according to aspects 1-10, wherein the graphical user interface further comprises an edit mode activation interactive element.

18. The computer-implemented method according to aspects 1-10, wherein the graphical user interface further comprises an edit mode deactivation interactive element.

19. A specialized computer, comprising:
 a memory which has stored therein computer executable instructions for a graphical user interface;
 a processor in communication with the memory, the processor being configured to load and execute the computer executable instructions of the graphical user interface when the computer executable instructions are read from the memory by the processor; and
 a display in communication with the processor, the display being configured to display the graphical user interface according to the computer executable instructions executed by the processor, wherein the graphical user interface displayed on the display includes:
  a first view portion and a second view portion,
  the first view portion includes a first image associated with a first digital content page stored in a memory of the computer, and
  the second view portion includes a second image associated with a second digital content page stored in the memory.

20. A non-transitory machine-readable storage medium which has stored therein computer executable instructions for a graphical user interface, the non-transitory machine-readable storage medium being connectable to a computer, wherein when the computer executes the computer executable instructions, the graphical user interface is displayed on a display of the computer, the graphical user interface comprises:
 a first view portion and a second view portion;
 the first view portion includes a first image associated with a first digital content page stored in a memory of the computer; and
 the second view portion includes a second image associated with a second digital content page stored in the memory.

Preferred embodiments have been described. Those skilled in the art will appreciate that various modifications and substitutions are possible, without departing from the scope of the invention as claimed and disclosed, including the full scope of equivalents thereof.

What is claimed is:
1. A computer-implemented method, comprising:
 displaying a graphical user interface on a display of a computer, wherein the graphical user interface comprises:
 a first view portion and a second view portion;
 the first view portion includes a first image associated with a first digital content page stored in a memory of the computer;
 the second view portion includes a second image associated with a second digital content page stored in the memory;

a slide bar;
a first slider associated with the slide bar for moving along the slide bar, the first slider controlling a first stacked order of the first stacked images;
a second slider associated with the slide bar for moving along the slide bar, the second slider controlling a second stacked order of the second stacked images; and
a tandem slider associated with the slide bar for moving along the slide bar, the tandem slider controlling both the first stacked order and the second stacked order together,
wherein the first view portion includes at least one more image, the at least one more image associated with an additional digital content page stored in the memory, wherein the at least one more image is displayed stacked behind the first image, wherein the first image and the at least one more image form a first stacked images, and
the second view portion includes at least one more image, the at least one more image is associated with an additional digital content page stored in the memory, wherein the at least one more image is displayed stacked behind the second image, wherein the second image and the at least one more image form a second stacked images.

2. The computer-implemented method according to claim 1, wherein the graphical user interface further comprises:
a first page identifier displaying the first stacked order of a top image of the first stacked images, wherein the first page identifier dynamically changes as the first slider is moved along the slide bar and/or as the tandem slider is moved along the slide bar.

3. The computer-implemented method according to claim 1, wherein the graphical user interface further comprises:
a second page identifier displaying the second stacked order of a top image of the second stacked images, wherein the second page identifier dynamically changes as the second slider is moved along the slide bar and/or as the tandem slider is moved along the slide bar.

4. The computer-implemented method according to claim 3, wherein the graphical user interface further comprises:
a first page identifier displaying the first stacked order of a top image of the first stacked images, wherein the first page identifier dynamically changes as the first slider is moved along the slide bar and/or as the tandem slider is moved along the slide bar.

5. The computer-implemented method according to claim 1, wherein the graphical user interface further comprises:
one or more page creation buttons for adding another image associated with another page stored in the memory to the first stacked images.

6. The computer-implemented method according to claim 1, wherein the graphical user interface further comprises:
one or more page creation buttons for adding another image associated with another page stored in the memory to the second stacked images.

7. The computer-implemented method according to claim 6, wherein the graphical user interface further comprises:
one or more page creation buttons for adding another image associated with another page stored in the memory to the first stacked images.

8. The computer-implemented method according to claim 1, wherein the graphical user interface further comprises:
a drag-and-drop image which can be selected from the first or second stacked images and dropped into the second or first stacked images, wherein the displaying of the first and/or second stacked images change dynamically to display removal of the selected image by changing the first and/or second stacked order.

9. The computer-implemented method according to claim 1, further comprising:
displaying the slider bar only when the number of pages stored in the memory is more than two.

10. The computer-implemented method according to claim 1, further comprising:
displaying the slider bar when the number of pages stored in the memory is more than three.

11. The computer-implemented method according to claim 1, further comprising:
displaying the slider bar when the number of pages stored in the memory is equal to three.

12. The computer-implemented method according to claim 1, further comprising:
undisplaying the slider bar when the number of pages stored in the memory is fewer than three.

13. The computer-implemented method according to claim 1, further comprising:
undisplaying the slider bar when the number of pages stored in the memory is two.

14. The computer-implemented method according to claim 1, wherein the graphical user interface further comprises an edit mode activation interactive element.

15. The computer-implemented method according to claim 1, wherein the graphical user interface further comprises an edit mode deactivation interactive element.

16. A specialized computer, comprising:
a memory which has stored therein computer executable instructions for a graphical user interface;
a processor in communication with the memory, the processor being configured to load and execute the computer executable instructions of the graphical user interface when the computer executable instructions are read from the memory by the processor; and
a display in communication with the processor, the display being configured to display the graphical user interface according to the computer executable instructions executed by the processor, wherein the graphical user interface displayed on the display includes:
a first view portion and a second view portion,
the first view portion includes a first image associated with a first digital content page stored in a memory of the computer,
the second view portion includes a second image associated with a second digital content page stored in the memory,
a slide bar,
a first slider associated with the slide bar for moving along the slide bar, the first slider controlling a first stacked order of the first stacked images,
a second slider associated with the slide bar for moving along the slide bar, the second slider controlling a second stacked order of the second stacked images, and
a tandem slider associated with the slide bar for moving along the slide bar, the tandem slider controlling both the first stacked order and the second stacked order together,
wherein the first view portion includes at least one more image, the at least one more image is associated with an additional digital content page stored in the memory, wherein the at least one more image is displayed stacked behind the first image, wherein the first image and the at least one more image form a first stacked images, and
the second view portion includes at least one more image, the at least one more image is associated with an additional digital content page stored in the memory, wherein the at least one more image is displayed stacked behind the second image, wherein the second image and the at least one more image form a second stacked images.

17. A non-transitory machine-readable storage medium which has stored therein computer executable instructions for a graphical user interface, the non-transitory machine-readable storage medium being connectable to a computer, wherein when the computer executes the computer executable instructions, the graphical user interface is displayed on a display of the computer, the graphical user interface comprises:

a first view portion and a second view portion;

the first view portion includes a first image associated with a first digital content page stored in a memory of the computer;

the second view portion includes a second image associated with a second digital content page stored in the memory;

a slide bar;

a first slider associated with the slide bar for moving along the slide bar, the first slider controlling a first stacked order of the first stacked images;

a second slider associated with the slide bar for moving along the slide bar, the second slider controlling a second stacked order of the second stacked images; and a tandem slider associated with the slide bar for moving along the slide bar, the tandem slider controlling both the first stacked order and the second stacked order together, wherein the first view portion includes at least one more image, the at least one more image is associated with an additional digital content page stored in the memory, wherein the at least one more image is displayed stacked behind the first image, wherein the first image and the at least one more image form a first stacked images, and the second view portion includes at least one more image, the at least one more image is associated with an additional digital content page stored in the memory, wherein the at least one more image is displayed stacked behind the second image, wherein the second image and the at least one more image form a second stacked images.

* * * * *